US011625752B2

(12) United States Patent
Sabeg et al.

(10) Patent No.: US 11,625,752 B2
(45) Date of Patent: Apr. 11, 2023

(54) CRYPTOGRAPHIC ANONYMIZATION FOR ZERO-KNOWLEDGE ADVERTISING METHODS, APPARATUS, AND SYSTEM

(71) Applicant: Ravel Technologies SARL, Etterbeek (BE)

(72) Inventors: Mehdi Eric Arnaud Sabeg, Paris (FR); Michel Joseph Koskas, Paris (FR)

(73) Assignee: Ravel Technologies SARL, Etterbeek (BE)

( * ) Notice: Subject to any disclaimer, the term of this patent is extended or adjusted under 35 U.S.C. 154(b) by 0 days.

(21) Appl. No.: 16/685,864

(22) Filed: Nov. 15, 2019

(65) Prior Publication Data
US 2020/0160388 A1 May 21, 2020

Related U.S. Application Data

(60) Provisional application No. 62/767,767, filed on Nov. 15, 2018.

(51) Int. Cl.
*G06Q 30/02* (2012.01)
*G06F 16/22* (2019.01)
(Continued)

(52) U.S. Cl.
CPC ..... *G06Q 30/0255* (2013.01); *G06F 16/2246* (2019.01); *G06F 21/602* (2013.01);
(Continued)

(58) Field of Classification Search
CPC ........... G06Q 30/0255; G06Q 30/0201; G06Q 30/0261; G06Q 30/0269; G06Q 50/265;
(Continued)

(56) References Cited

U.S. PATENT DOCUMENTS 7,472,093 B2 12/2008 Juels
7,856,100 B2 12/2010 Wang et al.
(Continued)

FOREIGN PATENT DOCUMENTS

EP 3031165 9/2014
EP 2965461 1/2016
(Continued)

OTHER PUBLICATIONS

Carpov et al., "Armadillo: A Compilation Chain for Privacy Preserving Application"—7 pages.
(Continued)

*Primary Examiner* — Patrick McAtee
*Assistant Examiner* — Vincent I Idiake
(74) *Attorney, Agent, or Firm* — K&L Gates LLP

(57) ABSTRACT

A cryptographic anonymization method, apparatus, and system are disclosed. An example apparatus includes a server configured to receive encrypted usage information and an identifier from an application operating on a user terminal and trans-cypher the encrypted usage information from a first encryption scheme to a second encryption scheme to create second encrypted usage information without decrypting the encrypted usage information. The server is also configured to convert and encrypt the identifier to an encrypted unique identifier. The server is further configured to compare the second encrypted usage information to a taxonomy of data labels using rules. For each match of at least some of the second encrypted usage information to a data label, the server is configured to add the encrypted unique identifier to the matching data label. The server uses the data labels and/or the encrypted unique identifier for serving advertisements to the user.

24 Claims, 12 Drawing Sheets

(51) Int. Cl.
  *G06F 21/60*  (2013.01)
  *G06Q 50/26*  (2012.01)
  *H04L 9/00*  (2022.01)
  *H04L 9/40*  (2022.01)
  *G06Q 30/0251*  (2023.01)
  *G06Q 30/0201*  (2023.01)

(52) U.S. Cl.
  CPC ..... *G06Q 30/0201* (2013.01); *G06Q 30/0261* (2013.01); *G06Q 30/0269* (2013.01); *G06Q 50/265* (2013.01); *H04L 9/008* (2013.01); *H04L 63/0428* (2013.01); *G06Q 2220/10* (2013.01)

(58) Field of Classification Search
  CPC ............ G06Q 2220/10; G06Q 30/0251; G06F 16/2246; G06F 21/602; G06F 21/6254; G06F 21/6245; H04L 9/008; H04L 63/0428; H04L 2209/42; H04L 9/14; H04L 63/0478; H04L 2463/102; H04L 63/0471; H04L 63/0421
  See application file for complete search history.

(56) References Cited

U.S. PATENT DOCUMENTS

| | | | |
|---|---|---|---|
| 8,281,121 | B2 | 10/2012 | Nath et al. |
| 8,539,220 | B2 | 9/2013 | Raykova et al. |
| 8,630,422 | B2 | 1/2014 | Gentry |
| 8,925,075 | B2 | 12/2014 | Krendelev et al. |
| 9,002,007 | B2 | 4/2015 | Nabeel et al. |
| 9,094,414 | B2 | 7/2015 | Immonen et al. |
| 9,773,226 | B2 | 9/2017 | Kang |
| 10,037,544 | B2 * | 7/2018 | Smith .................. H04L 9/008 |
| 10,216,551 | B1 * | 2/2019 | Jha ..................... G06F 16/00 |
| 2011/0196741 | A1 | 8/2011 | Gupta et al. |
| 2013/0061062 | A9 * | 3/2013 | Saito ................. H04N 21/4181 713/193 |
| 2013/0097417 | A1 | 4/2013 | Lauter et al. |
| 2015/0149765 | A1 | 5/2015 | Pauliac et al. |
| 2015/0295716 | A1 * | 10/2015 | Liu ...................... H04L 9/008 713/191 |
| 2016/0004874 | A1 | 1/2016 | Ioannidis et al. |
| 2016/0020898 | A1 | 1/2016 | Nikolaenko et al. |
| 2016/0189461 | A1 | 6/2016 | Kanon et al. |
| 2016/0337319 | A1 | 11/2016 | Vaya et al. |
| 2016/0371684 | A1 | 12/2016 | Abbott et al. |
| 2017/0177683 | A1 | 6/2017 | Koike et al. |
| 2017/0230344 | A1 | 8/2017 | Dhar et al. |
| 2017/0235736 | A1 | 8/2017 | Swaminathan et al. |
| 2017/0364956 | A1 | 12/2017 | Dhar et al. |
| 2018/0307859 | A1 * | 10/2018 | LaFever ............... G16H 10/60 |
| 2019/0013950 | A1 * | 1/2019 | Becker ................. H04L 9/3247 |
| 2019/0334708 | A1 * | 10/2019 | Carpov ................. H04L 9/008 |

FOREIGN PATENT DOCUMENTS

| | | |
|---|---|---|
| EP | 2965462 | 1/2016 |
| EP | 2965463 | 1/2016 |
| EP | 2965464 | 1/2016 |
| EP | 3031164 | 6/2016 |
| WO | 2016106205 | 6/2016 |
| WO | 2017187207 | 11/2017 |

OTHER PUBLICATIONS

Toubiana et al., "Adnostic: Privacy Preserving Targeted Advertising"—23 pages.
Chabanne et al., "Privacy-Preserving Classification on Deep Neural Network"—18 pages.
Shafagh et al., "Secure Sharing of Partially Homomorphic Encrypted IoT Data"; SenSys Nov. 6-8, 2017—14 pages.
Lauter et al., "Can Homomorphic Encryption be Practical?" Microsoft Research—18 pages.
Tran et al., "Retargeting Without Tracking", Apr. 17, 2014—22 pages.
Xiao et al., "An Efficient Homomorphic Encryption Protocol for Multi-User Systems"—19 pages.
International Search Report PCT/IB2019/059855 dated Feb. 17, 2020—6 pages.
Written Opinion PCT/IB2019/059855 dated Feb. 17, 2020—10 pages.
Nritten Opinion for related International Patent Application No. PCT/IB2019/059855 dated May 27, 2021. 5 pages.

* cited by examiner

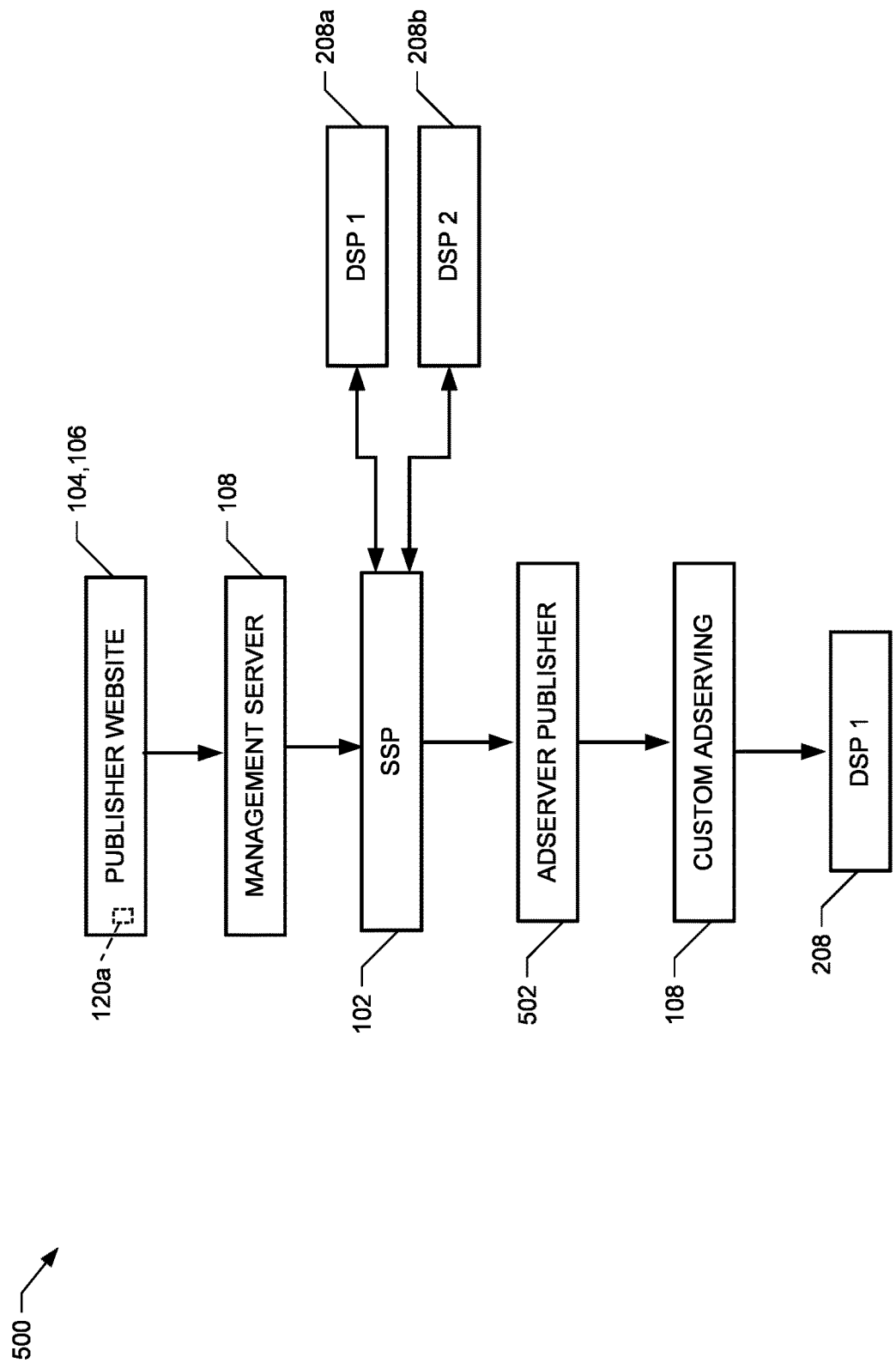

CRYPTOGRAPHIC ANONYMIZATION FOR ZERO-KNOWLEDGE ADVERTISING METHODS, APPARATUS, AND SYSTEM

PRIORITY CLAIM

This application claims priority to and the benefit as a non-provisional application of U.S. Provisional Patent Application No. 62/767,767, filed Nov. 15, 2018, the entire contents of which are hereby incorporated by reference and relied upon.

BACKGROUND

Online advertising, facial recognition algorithms, connected vehicles, Internet-of-Things ("IoT") applications, polls, smart grids, and medical applications comprise some of the more widely used technology applications that create or use personal data. While the services these different applications provide are important in today's connected environment, the amount of personal data generated raises questions about who possesses the data, how it is being used, and whether it is protected. As abuses of private personal data become more widespread, many individuals (and some national governments) are searching for ways to provide personal data security without compromising connectivity.

One field that is the most threatening today to privacy is digital advertising, which has almost unlimited access to personal data. Targeted online advertising, also known as online behavioral advertising, has become commonplace for almost every website, search engine, social media platform, webmail program, etc. It has gotten to the point that most people do not even notice the advertisements lining the banners or ad boxes in their web browsers or mobile applications. Many people just assume its normal for a web browser to review their browsing history and thereafter display advertisements related to the websites visited or products purchased. For example, after visiting the website of Lacoste®, many web banners on subsequent webpages (such as new websites) display banner ads or video box ads for Lacoste® products.

However, every so often, there is an advertisement that stands out. The advertisement stands out not because the content is offensive or the message is compelling. Instead, the advertisement stands out because it represents a violation of personal privacy. The advertisement may reflect, for example, something that was written in a personal email message, communicated via a text message, posted to a private social media account, or bought in a store using a loyalty card. Other than analyzing that very personal content, there is no way a company or server would know to place that particular advertisement.

In an example, an individual writes a social media message to their significant other expressing an interest in vacationing in Bonaire during the last week in June. Up to that point, the individual never visited a travel site related to Bonaire or even looked up Bonaire on a map. And indeed, Bonaire is not a relatively popular travel destination. However, shortly after sending the email, the individual's web browser provides banner ads and video ads for Bonaire, with text about room specials for the last week in June. Worse yet, the individual's web browser displays advertisements for neighboring islands including Aruba and Curacao.

In more embarrassing examples, an individual may discuss prospects of a divorce or a medical issue through social media. Afterwards, the individual or another user of the individual's computer may later find advertisements in banner ads for divorce lawyers or the medical issue. Even seemingly deeply private conversations are at the mercy of monetization in today's environment.

As mentioned above, personal data is also prone to abuse outside of the advertising space. For instance, personal data collected from polls, IoT connected devices, medical/fitness devices, and facial recognition sensors is generally not protected during collection or transmission. Moreover, the personal data may be made available to data processors such as information society service companies or advertisers that collect and analyze data from their users/clients. The personal data may further be made available to third-parties, such as data brokers, cloud providers, or advertising technological companies that provide data analytics, advertisements placement, and/or bidding technologies or services. The personal data is made available to all of these entities regardless of any data protection safeguards implemented by a hosting site. Oftentimes, people are not even aware their personal data is being collected, shared with a multitude of companies, and monetized.

Needless to say, an increasing number of people are becoming weary regarding how their personal data is being used outside their control. Many companies, especially in the United States, have virtually disregarded privacy of personal data in return for profits generated by advertising revenue. Very recently, Facebook® came under fire for permitting unauthorized use of its member's personal data for borderline illegal election influence. To improve the protection of personal data, the European Union implemented the General Data Protection Regulation ("GDPR"). However, the GDPR only applies to Europe and requires that companies follow the regulations. Other countries have also started implementing GDPR-inspired regulations such as the California Consumer Privacy Act ("CCPA"). However, as the industry has seen, despite compliance, there is a likely possibility that breaches and misuse of personal data will continue to occur.

A solution to protect an individual's private data is to encrypt the data. For example, messages between individuals can be encrypted while in transit. In addition, web browsing content, website content, or social media content can be encrypted while stored. However, encryption of data prevents analytics from being performed on the data by third-parties or by data controllers themselves. As a result, targeted advertisements cannot be placed using encrypted personal data, thereby significantly reducing the value of online advertisements and making encryption unpractical and used as little as possible at the expense of individuals' privacy.

The absence of personal data significantly reduces the revenue stream of most online providers, thereby threatening the historically "free and independent" Internet model and taking away powerful technologies for companies to efficiently promote their products/services. If personal data cannot be monetized, online providers will have to turn to other sources of revenue, such as subscriptions and fees to access even the most basic content or providing different tiers of data transmission rates based on fees. As one can imagine, online content providers, search engine providers, social media providers, online advertisers, etc. are resistant to encrypting data permanently to preserve advertisement revenue streams instead of forcing users to pay directly.

SUMMARY

The present disclosure is directed to a system, method, and apparatus that provide an innovative equilibrium between the imperious need for companies to be able to collect, process, and benefit from targeted advertising technologies and the essential protection of individuals' privacy and personal data. The system, method, and apparatus disclosed herein are configured to use one or more algorithms or computational models to enable one or more participants of a personalized advertising chain to anonymously determine a user's preferences (or otherwise provide secured personal data analysis) by analyzing encrypted personal data. The system, method, and apparatus provide an innovative equilibrium between the imperious need for companies to be able to collect, process, and benefit from targeted advertising technologies and the essential protection of individuals' privacy and personal data. The example system, method, and apparatus receive a user's browsing history, online navigation information, geolocation data, transaction data, personal identifiers, and other usage information (or personal data) in an encrypted format. Instead of decrypting the information, the example system, method, and apparatus compare the encrypted information to one or more rules related to user segmentation and/or categorization. The analysis of the encrypted information is used to assign a user identifier to one or more categories or segments associated with web browsing/navigation, application usage, and/or other personal data. A third-party server may access the categories and/or segments to obtain the assigned user identifiers to determine which users should be provided a particular advertisement (or other content) and/or whether a particular user is included in a category or profile (e.g., a collection of categories) to provide targeted advertisements or other content placement. The system, method, and apparatus may enable the placement of anonymously delivered targeted advertisements.

The example system, method, and apparatus acquire a user's browsing history and other related usage data according to categories or segments, which may be hierarchal. The system, method, and apparatus use one or more rules that define criteria for categories or segments. Based on the rules, the example system, method, and apparatus determine categories that correspond to content a user is viewing and create an instance or count for those categories. The system, method, and apparatus protect a user's identity by encrypting the instance/count and/or the category identifier before transmission across a network. The example system, method, and apparatus analyze the encrypted instances/counts and/or category/segment identifiers to create or update a user vector across available categories/segments. The data is then made available to a third-party by adding or updating an identifier of the user for one or more categories/segments. A third-party and/or the system, method, and apparatus may create a category/segment profile by combining categories or segments that correspond to a particular targeted-content goal. Accordingly, third-parties do not have access to a user's profile (only user terminals and/or a secure server has a key for user-encrypted data). Instead, third-parties are provided access to categories/segments and a list of users associated with those categories/segments (e.g., profiles). In some embodiments, the example system, method, and apparatus may only provide, to a third-party, identifiers of users for requested (permitted) categories/segments or profiles to prevent the third-parties from reconstructing a user's individual profile. However, the example system, method, and apparatus may provide third-party data processors with category information to create specific content profiles relevant to the particular third-party data processor.

In some embodiments, the example system, method, and apparatus are configured to use homomorphic encryption on a user's browsing, purchasing, and/or commerce information. The use of homomorphic encryption enables patterns or trends (indicative of a user's preferences) to be identified using one or more category rules. The example system, method, and apparatus use encryption to secure and anonymize a user's information (including geolocation information), thereby preventing any party from intercepting, processing, accessing, and analyzing the information in plaintext. Further, the example system, method, and apparatus anonymize a user's information by only providing patterns, trends, etc. for a particular set of categories (related to dynamic identifiers) to a third-party rather than a user's personal information. Thus, third-parties select advertisements or other content for placement based on generalized categorical profile information for groups of users with similar browsing, purchasing, or commerce histories rather than based on an identity or personal profile of the user. Accordingly, the example system, method, and apparatus maintain targeted advertising revenue streams for online content and service providers through efficient processes that enable advertisers to promote their products/services while anonymizing and protecting a user's personal information.

Aspects of the subject matter described herein may be useful alone or in combination with one or more other aspect described herein. Without limiting the foregoing description, in a first aspect of the present disclosure, a cryptographic anonymization system includes an application operating on a user terminal of a user. The application is configured to identify and collect usage information that relates to web usage, application usage, and/or service usage of the user terminal, encrypt at least some of the usage information using a first encryption scheme, and transmit the at least some of the encrypted usage information and an identifier of the application or the user terminal. The system also includes a management server communicatively coupled to the application via a network. The management server is configured to trans-cypher the at least some of the encrypted usage information from the first encryption scheme to a second encryption scheme to create second encrypted usage information without decrypting the at least some of the encrypted usage information, and convert the identifier to a unique or dynamic identifier. The system further includes a data processor communicatively coupled to the management server. The data processor is configured to compare the second encrypted usage information to a taxonomy of data labels, at least some of the data labels including unique or dynamic identifiers of other users. For each match of at least some of the second encrypted usage information to a data label, the data processor is configured to add the unique or dynamic identifier to the matching data label. The data processor is further configured to provide at least one of the data labels or the corresponding unique or dynamic identifiers for serving advertisements when at least one of (i) one of the unique or dynamic identifiers is received, or (ii) advertisement information corresponding to one of the data labels is received.

In accordance with a second aspect of the present disclosure, which may be used in combination with any other aspect listed herein unless stated otherwise, the first encryption scheme includes a Symmetric Encryption System ("SES") scheme or an Advanced Encryption Standard ("AES") scheme, and the second encryption scheme includes a homomorphic encryption scheme or a fully homomorphic encryption scheme.

In accordance with a third aspect of the present disclosure, which may be used in combination with any other aspect listed herein unless stated otherwise, the usage information includes information that is indicative of at least one of web browsing, purchases, navigation, commerce, geolocation, application usage, or online/offline service usage, and the usage information includes at least one of keys, values, metadata, labels, or tags related to a webpage, offline usage/purchases, or an application.

In accordance with a fourth aspect of the present disclosure, which may be used in combination with any other aspect listed herein unless stated otherwise, at least one of the application or the management server is configured to organize the at least some of the usage information into a data hierarchy or any other type of database structure such as a functional database structure or any combination of database structure using specified section information.

In accordance with a fifth aspect of the present disclosure, which may be used in combination with any other aspect listed herein unless stated otherwise, the management server is configured to convert the identifier to at least one of a unique or dynamic identifier by performing a function or an operation on the identifier.

In accordance with a sixth aspect of the present disclosure, which may be used in combination with any other aspect listed herein unless stated otherwise, the management server is configured to create a correspondence between the unique or dynamic identifier and the at least some of the second encrypted usage information.

In accordance with a seventh aspect of the present disclosure, which may be used in combination with any other aspect listed herein unless stated otherwise, the data processor is configured to use one or more rules for comparing the second encrypted usage information to the taxonomy of data labels, at least some of the one or more rules specifying an occurrence threshold, a value range, or a label value.

In accordance with an eighth aspect of the present disclosure, which may be used in combination with any other aspect listed herein unless stated otherwise, the management server is configured to encrypt the unique or dynamic identifier using a general encryption scheme.

In accordance with a ninth aspect of the present disclosure, which may be used in combination with any other aspect listed herein unless stated otherwise, the data processor is configured to add noise to at least some of the data labels for which a match was not made.

In accordance with a tenth aspect of the present disclosure, which may be used in combination with any other aspect listed herein unless stated otherwise, the data processor is configured to decrypt the noise and the encrypted unique or dynamic identifiers that are associated with the data labels, remove the noise from the data labels, and encrypt the unique or dynamic identifiers.

In accordance with an eleventh aspect of the present disclosure, which may be used in combination with any other aspect listed herein unless stated otherwise, the data processor is configured to receive a target label from a demand-side platform ("DSP") server or a data management platform ("DMP") server, determine a data label that matches the target label, and transmit encrypted unique or dynamic identifiers that are associated with the determined label to the DSP server or the DMP server.

In accordance with a twelfth aspect of the present disclosure, which may be used in combination with any other aspect listed herein unless stated otherwise, the management server is configured to receive a second identifier of a second application or a second user terminal, convert the second identifier to a second unique or dynamic identifier, and transmit the second unique or dynamic identifier to a demand-side platform ("DSP") server.

In accordance with a thirteenth aspect of the present disclosure, which may be used in combination with any other aspect listed herein unless stated otherwise, the data processor is configured to receive a message from the DSP server with the second unique or dynamic identifier, determine, as target data labels, data labels among the data labels that correspond to an advertising campaign of the DSP server, compare the second unique or dynamic identifier to the unique or dynamic identifiers of the target data labels, and transmit an affirmative message to the DSP server for serving an advertisement to the user terminal or another user terminal if the second unique or dynamic identifier matches one of the unique or dynamic identifiers of the target data labels.

In accordance with a fourteenth aspect of the present disclosure, which may be used in combination with any other aspect listed herein unless stated otherwise, the management server is configured to receive two or more unique or dynamic identifiers of an application or a user terminal and one more or more unique or dynamic identifiers from another application, user terminal or third party database, link the identifiers together, and built an identity graph of the same user across different terminals, applications, and/or databases.

In accordance with a fifteenth aspect of the present disclosure, which may be used in combination with any other aspect listed herein unless stated otherwise, the data processor is configured to apply one or more queries on the second encrypted usage information to at least one of compare, group, classify, order, or score the second encrypted usage information, at least some of the one or more queries specifying at least one of an occurrence threshold, a value range, or a label value.

In accordance with a sixteenth aspect of the present disclosure, which may be used in combination with any other aspect listed herein unless stated otherwise, a cryptographic anonymization method includes receiving, in a server, encrypted usage information and an identifier from an application operating on a user terminal. The encrypted usage information is encrypted via a first encryption scheme and the identifier being relates to a user of the user terminal. The method also includes trans-cyphering, via the server, the encrypted usage information from the first encryption scheme to a second encryption scheme to create second encrypted usage information without decrypting the encrypted usage information. The method further includes converting, via the server, the identifier to a unique or dynamic identifier and encrypting, via the server, the unique or dynamic identifier. Additionally, the method includes comparing, via the server, the second encrypted usage information to a taxonomy of data labels using rules that relate encrypted usage information to respective data labels. At least some of the data labels includes encrypted unique or dynamic identifiers of other users. For each match of at least some of the second encrypted usage information to a data label, the method includes adding, via the server, the encrypted unique or dynamic identifier to the matching data label. Moreover, the method includes providing, via the server, at least one of the data labels or the corresponding encrypted unique or dynamic identifiers for serving advertisements when at least one of (i) one of the encrypted unique or dynamic identifiers is received, or (ii) advertisement information corresponding to one of the data labels is received.

In accordance with an eighteenth aspect of the present disclosure, which may be used in combination with any other aspect listed herein unless stated otherwise, the method further includes identifying and collecting, via the application, usage information that relates to web usage of the user terminal, encrypting, via the application, at least some of the usage information using a first encryption scheme to form the first encrypted usage information, and transmitting, from the application to the server over a network, the encrypted usage information and the identifier.

In accordance with a seventeenth aspect of the present disclosure, which may be used in combination with any other aspect listed herein unless stated otherwise, the first encryption scheme includes a Symmetric Encryption System ("SES") scheme or an Advanced Encryption Standard ("AES") scheme, the second encryption scheme includes a homomorphic encryption ("HE") scheme or a fully homomorphic encryption ("FHE") scheme, and the unique or dynamic identifier is encrypted using at least one of a general encryption scheme, the SES scheme, the AES scheme, the HE scheme, or the FHE scheme.

In accordance with a nineteenth aspect of the present disclosure, which may be used in combination with any other aspect listed herein unless stated otherwise, the method further includes adding, via the server, noise in the form of fake encrypted identifiers to a list associated with at least some of the data labels for which a match was not made, decrypting, via the server, the noise and the encrypted unique or dynamic identifiers that are associated with the data labels, removing, via the server, the noise from the list associated with the data labels, and encrypting again, via the server, the unique or dynamic identifiers.

In accordance with a twentieth aspect of the present disclosure, which may be used in combination with any other aspect listed herein unless stated otherwise, the method further includes receiving, in the server, a second identifier related to a second user, the second identifier being provided for serving an advertisement, converting, via the server, the second identifier to a second unique or dynamic identifier, and encrypting, via the server, the second unique or dynamic identifier.

In accordance with a twenty-first aspect of the present disclosure, which may be used in combination with any other aspect listed herein unless stated otherwise, the method further includes transmitting, from the server, the second encrypted unique or dynamic identifier to a supply-side platform ("SSP").

In accordance with a twenty-second aspect of the present disclosure, which may be used in combination with any other aspect listed herein unless stated otherwise, the method further includes receiving, in the server, a message from a demand-side platform ("DSP") server with the second encrypted unique or dynamic identifier, determining, in the server as target data labels, data labels among the data labels that correspond to an advertising campaign of the DSP server, comparing the second encrypted unique or dynamic identifier to the encrypted unique or dynamic identifiers of the target data labels, and transmitting, from the server, an affirmative message to the DSP server for serving an advertisement to the second user terminal if the second encrypted unique or dynamic identifier matches one of the encrypted unique or dynamic identifiers of the target data labels.

In a twenty-third aspect of the present disclosure, any of the structure and functionality disclosed in connection with FIGS. 1 to 11 may be combined with any other structure and functionality disclosed in connection with FIGS. 1 to 11.

In light of the present disclosure and the above aspects, it is therefore an advantage of the present disclosure to provide a system that provides for the protection of user information for serving advertisements.

It is another advantage of the present disclosure to perform calculations on encrypted user information without decrypting the user information for determining which targeted advertisements should be served.

It is a further advantage of the present disclosure to merge different sources of user information from one or more encrypted data sources and perform secured multi-party calculations on the merged encrypted user information without decrypting the user information for determining which targeted advertisements should be served.

It is yet another advantage of the present disclosure to prevent a user's information from being reconstructed for identification of a user.

The advantages discussed herein may be found in one, or some, and perhaps not all of the embodiments disclosed herein. Additional features and advantages are described herein, and will be apparent from, the following Detailed Description and the figures.

BRIEF DESCRIPTION OF THE FIGURES

FIGS. 5 and 6 show diagrams that are illustrative of procedures for purchasing media, according to example embodiments of the present disclosure.

DETAILED DESCRIPTION

Figure 1:
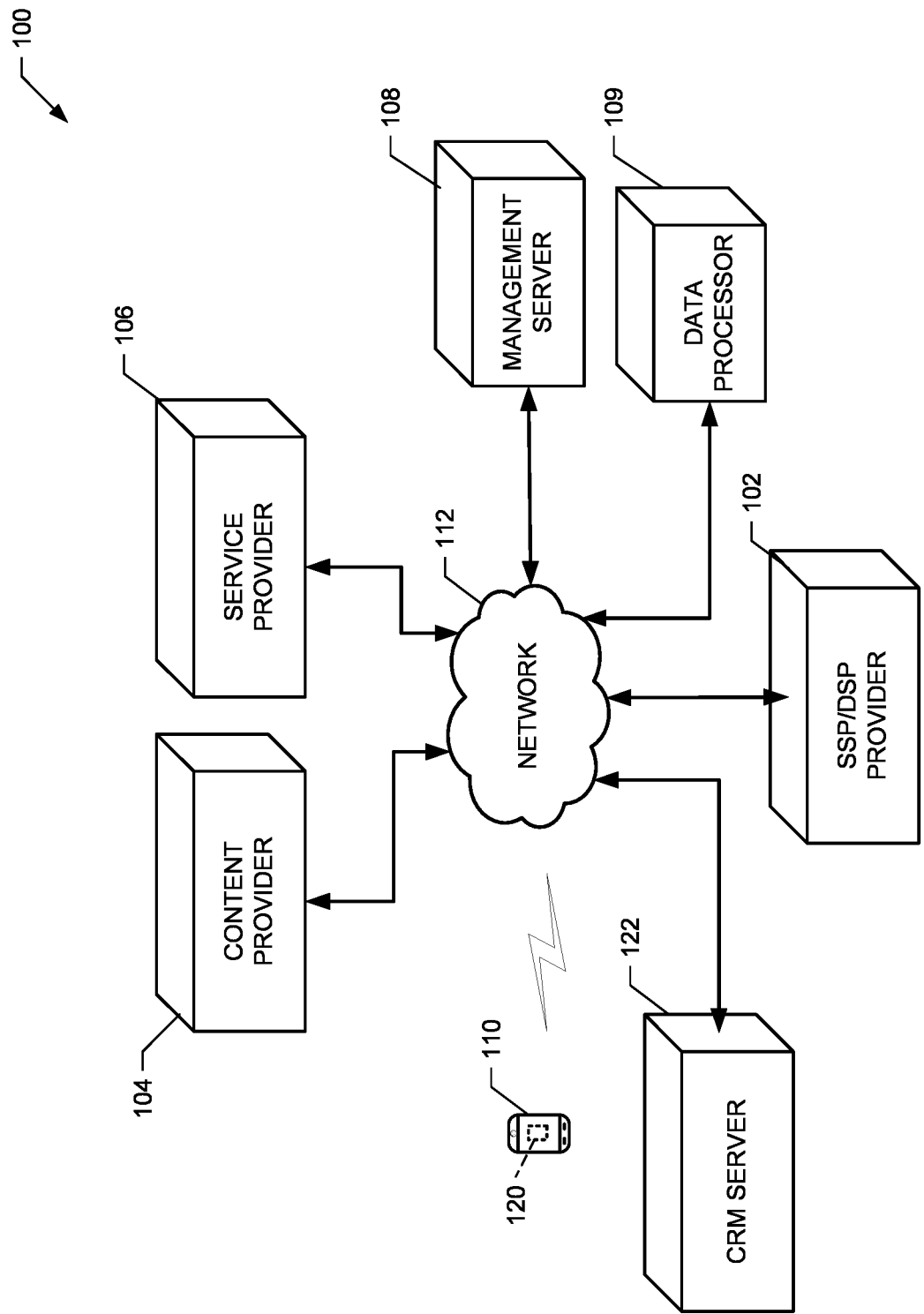
FIG. 1 shows a diagram of an example targeted advertising system including a management server, according to an example embodiment of the present disclosure.

The present disclosure relates in general to a method, system, and apparatus configured to use homomorphic encryption to provide anonymized user information to a third-party server to enable content to be selected and served to a user terminal (e.g., digital advertisement placement). The method, system, and apparatus disclosed herein receives an encrypted input in the form of user information, which is processed and anonymized in an encrypted format. The method, system, and apparatus process the encrypted user information, without decrypting, to determine categories/segments of content viewed, interacted with, and/or created by a user in a web page or application. The categories are determined, in some embodiments, using one or more rules that specify content conditions for the categories/segments. Identifiers of the users are assigned to categories/segments that are determined from an analysis of the users' encrypted information, which is indicative of their web browsing/application use. Third-party servers may request lists of user identifiers for certain categories/segments to create profiles of groups of similar users to identify whether a particular advertisement or other content should be served to a user and/or to identify advertisements or other content that relates to a user's information including past browsing or navigation experience. As disclosed herein, a user's past browsing may include data indicative of previously viewed advertisements or media content. In addition, a user's information may include user preferences, transaction data, credit card or payment information, geolocation data, offline purchases, commerce information, IoT/navigation related data, electrical grid balance information, polling data, political data, medical diagnosis/recommendation, facial recognition feedback, etc.

As disclosed herein, a user's web browsing history or application usage includes one or more categories or segments of content, products, prices, product selections, product purchases, etc. The categories or segments may be organized in a hierarchical structure. In some embodiments, the categories are relatively granular, such as a category for women's shoes, a webpage related to professional baseball information, socio-professional general information, or a travel application in which a user searched for tropical islands. In other embodiments, the categories or segments are more precise. For example, a category for a webpage related to shoe purchases may be categorized as shoes→sport shoes→women→price [20, 50]. In other examples, the categories or segments may indicate a professional baseball team or specific islands searched in the South-Pacific.

As described in more detail below, the categories and/or segments are defined by or relate to one or more rules. The rules are configured to define how content on a webpage or application is determined to be related to one or more categories. The rules may also define a count or incremental value that is associated with a matching category to enable the reporting of a user's browsing or navigation history. In other words, the rules specify how webpage or application information is translated into a snapshot of a user's browsing or navigation behavior without containing a user's personal information. In some embodiments, the rules may be replaced or used in conjunction with other data classification methods, such as neural networks, supervised classification, unsupervised classification, graph databases, etc.

Reference is made to data anonymization. As discussed throughout, data anonymization refers to an irreversible process that de-personalizes data related to an individual user and makes the data permanently untraceable by any party. In some instances, the data for individual users cannot even be re-identified by a homomorphic encryption processor that provides the example system, method, and apparatus disclosed herein. In the described method, system, and apparatus, a user's data is encrypted end-to-end and analyzed by one or more participants using homomorphic encryption. The analysis based on homomorphic encryption enables user data to be analyzed, visualized, and organized at the individual-level, while preventing the personal data to be decipherable, therefore keeping personal data anonymized and secure at all times. Decryption keys are not provided, and need not be created, because the data is not decrypted by the example method, system, and apparatus or third-party servers.

Reference is made herein to digital advertisement placement. Digital advertisements may include static images, video, audio, animated graphics interchange formatted ("GIF") content, text, etc. Digital advertisements are configured to be presented within a banner or in-text advertisement space in a web browser on a webpage. Digital advertisements may also be configured for presentation within an application. Some digital advertisements may be displayed as a pop-up window or overlaid on webpage content. Further, some digital advertisements may be presented as search results for a search engine. In addition to online environments, digital advertisements may be included within streaming content, television broadcast programming, and/or radio programming.

The example method, system, and apparatus disclosed herein may also be configured to facilitate the placement of other content. For instance, third-party providers may determine user preferences for products, services, or experiences based on the relevant categories in which a user is assigned. Third-party providers may also determine what a user likes or hates (based on the category information) for communicating this information to other users or content/service providers.

The example method, system, and apparatus may also be used for secure personal data analysis of non-advertising related data. For example, the method, system, and apparatus disclosed herein may analyze categorized or segmented encrypted personal data from polls, medical/fitness trackers, IoT devices, and/or facial recognition sensors. The analysis is secure since it is conducted over homomorphic encrypted data and reduced to pre-defined categories or segments. Results from the analysis may be used to provide a personalized service, secure result, and/or feedback. For instance, the method, system, and apparatus may use encrypted facial recognition information to provide user verification or entry control. In another example, encrypted medical or fitness information may be used for providing health recommendations or feedback. In yet another example, encrypted IoT data may be securely analyzed to schedule certain events (such as appliance repair, food ordering, etc.) or provide context-relevant messages to a user.

Reference is further made to homomorphic encryption. As disclosed herein, homomorphic encryption is a form of encryption that permits computation on ciphertexts. The computation generates an encrypted result which, when decrypted, matches or at least closely resembles the result of the computations as if they had been performed on plaintext. The purpose of homomorphic encryption herein is to enable computation (e.g., mathematic operators) on encrypted data, such as category information. In some embodiments, the example system, method, and apparatus disclosed herein may support arbitrary computation on ciphertexts, which is known as fully homomorphic encryption ("FHE").

The example system, method, and apparatus are configured to protect user's personal information while enabling the user to receive personalized and relevant advertising or other directed content. Such a configuration offers the advertisement industry and information society industry an unprecedented OBA ("Online Behavioral Advertising") ethical solution while preserving the "free internet" model based on the activation and monetization of users' personal information.

In some embodiments, the example method, apparatus, and system disclosed herein include an application installed on a user device or terminal that collects a user's browsing/navigation information or application use based on categorization. The example method, apparatus, and system disclosed herein may also collect a user's geolocation data. The application may conduct a pre-processing routine on the collected data to anonymize the data, thereby making the re-identification from the pre-processed data impossible without a personal identifier. The data handled by the example method, apparatus, and system (and third-parties) may no longer include the pages visited or the precise actions performed on a website (such as ones collected by cookies), but rather an aggregation of categories related to a user's browsing/navigation/application use (e.g., a glazed cookie). In some embodiments, at least some categories with no information may also be sent with an encrypted null or zero value (in addition to categories with a count or indication of at least a value of '1'), making it increasingly more difficult to reconstruct a user's profile from transmitted encrypted data and preserve anonymity. Further, in some embodiments, the categories themselves may also be encrypted, thereby further protecting user information.

The example system, methods, and apparatus described herein accordingly provide a "zero-knowledge" advertising system based on homomorphic encryption of categorical data related to a user's browsing activity, navigation, and/or application usage. The example system, methods, and apparatus disclosed herein enable online advertising players, from editors to advertisers and/or data processors, to continue benefiting from user online/offline behavioral advertising activities while at the same time guaranteeing a high level of individual privacy and data protection through data anonymization. The example system, methods, and apparatus provide compliance with the highest standards of legal personal data protection while still enabling monetization of user information, thereby protecting the free and independent Internet model for users and allowing innovative OBA technologies to efficiently promote advertisers' products and/or services.

Example System

FIG. 1 shows an example content serving system 100 in which a user's encrypted use information is determined and used for targeted advertising, according to an example embodiment of the present disclosure. The example system 100 is configured to permit OBA with a high level of data protection without compromising the privacy of users. The example system 100 ensures that the processing of user personal information along with their IP address are never accessible as a result of homomorphic encryption and zero-knowledge advertisement processing. Additionally, the system 100 ensures that no party can access non-encrypted personal information. While ensuring personal data protection, the example system 100 provides for categorization of user browsing behavior, navigation information, purchasing and commercial online/offline information, and/or application usage (i.e., user information). Targeted group profiles may be created from the categorized information and linked or referenced to certain advertisement targets, campaigns, and/or advertisements themselves. Thus, when a user identifier is later received from web browsing or application usage, the system 100 can identify one or more advertisements to serve to the user by matching a user's unique identifier to their identifier contained within one or more profiles.

The example system 100 is illustrated as operating in a supply-side platform ("SSP") in which a SSP provider 102 provides advertisements and other targeted content to one or more content providers 104 and/or service providers 106 (e.g., content publishers). In other embodiments, the system 100 may additionally or alternatively operate in a demand-side platform ("DSP") or a combination of a SSP and DSP. Moreover, in some embodiments, the system 100 is configured for a walled garden and/or header bidder framework. In the SSP configuration, the providers 104 and 106 use the SSP provider 102 to activate data from users and monetize the available inventories through OBA. For example, the content provider 104 and/or the service provider 106 have designated spaces on hosted websites, applications, social media platforms, etc. for advertisements. Normally, the providers 104 and 106 collect a user's information, which is transmitted to the SSP provider 102. The SSP provider 102 in turn analyzes the user information, uses the user information to create a request for a proposal to valorize inventories on an ad exchange, selects the advertisements of the highest bidders, and identifies one or more targeted advertisements, which are then transmitted to the providers 104 and/or 106 to display in conjunction with their content to the users. In some embodiments, the providers 104 and 106 and/or the SSP provider 102 may also use user information from one or several third-parties (such as data brokers) to further complete a user's profile for selecting an advertisement.

In contrast to known systems, the example system 100 of FIG. 1 includes a management server 108 that is configured as a secured proxy between the providers 104 and 106 and the SSP provider 102. The system 100 also includes a data processor 109 that analyzes encrypted user information (received from one or more user terminals 110) using one or more crypto-calculations to create a user vector that relates a user's online or application usage to one or more pre-defined categories. The data processor 109 may use one or more application programming interfaces ("APIs") that perform the calculations on the encrypted data. The management server 108 is configured to remove and/or encrypt any user-identifying information, such as IP addresses, MAC addresses, etc. such that the encrypted information is associated with a unique user identifier (e.g., an identification anonymization process). The data processor 109 is configured to compile or otherwise aggregate a list of users by their identifiers for each category (and/or subcategories). In some embodiments, the data processor 109 creates one or more profiles of combined categories. The profiles contain lists of user identifiers that share common online usage or application usage, and are used by the example system 100 for selecting designated advertisements for a particular profile.

In some examples, the profiles may also be created by one or more data processors 109. The data processor 109 may host be hosted or operated by, or otherwise have a relationship with the content provider 104 and/or the service provider 106. The data processor 109 is configured to create profiles based on content viewed or application usages by users through the related provider 104 and/or 106. In other words, the data processor 109 is configured to provide data analytics of anonymous user data to optimize targeted advertising space or other targeted content and/or services. The data processor 109 is configured to transit the profile to the DSP provider 102 (and/or SSP provider), which uses the profile for selecting an advertisement to serve when a matching identifier is received at a later time during bidding operations when a user is browsing or otherwise using a website or application related to the data provider 109.

As described above, the SSP provider 102 (and/or DSP provider) is configured to transmit an advertisement for display. To further anonymize the process, the SSP provider 102 (and/or DSP provider) may encrypt an advertisement and transmit the advertisement to the management server 108, which routes the advertisement to the user's terminal 110 and/or the providers 104 and 106 for display on a webpage or other content provided by the providers 104 and 106. In some alternative embodiments, the selected advertisement may be sent directly to the user terminal 110 and/or provided on the application/webpages of the providers 104 and 106, using an IP or other destination address securely and temporarily held available during the bidding process by the management server 108.

In the illustrated example, a user terminal 110 is communicatively coupled to one or more of the content provider 104, the service provider 106, the management server 108, the data processor 109, and the SSP provider 102 via a network 112. The user terminal 110 may include a smartphone, cellular phone, tablet computer, smart-eyewear, smartwatch, virtual-reality headset, laptop computer, desktop computer, connected television, workstation, smart device, etc. While FIG. 1 shows a single user terminal 110, it should be appreciated that the system 100 may include a plurality of user terminals 110 connected to the network 112. The network 112 may include any wide area network (e.g., the Internet), local area network, cellular network, or combinations thereof. The user terminal 110 includes a processor and a memory storing instructions for operating a web browser or application for accessing webpages or services from one or more of the content providers 104. The processor and memory of the user terminal 110 also operate in conjunction for executing one or more application that access content from the content provider 104 and/or the service provider 106. Applications may include news forums applications, e-commerce applications, audio streaming applications, games, movie/television show streaming applications, social media applications, messaging applications, personal finance and payment applications, etc.

In some embodiments, the example user terminal 110 also includes a data collection application 120, which may be operated by the providers 104 and/or 106. In other instances, the providers 104 and 106 collect user information from another data source and transform personal identifiers of users and associated collected user information into dynamic identifiers and encrypted data. These other instances may render moot the use of the application 120. The providers 104 and 106 may use the data processor 109 as, for example, a data management platform ("DMP") for collecting and processing online data. The providers 104 and 106 may transmit an identifier of a user and collected information to the management server 108. In some instances, the providers 104 and 106 may include the application 120 for encrypting both user (usage) information and identifiers.

FIG. 1 also shows a customer relationship management ("CRM") server 122 that is configured to collect offline data related to users. The offline data may include data related to purchases of items and/or services in physical retail locations. The CRM server 122 may transmit collected data and user identifiers for encryption at the management server 108. In other instances, the CRM server 122 may include the application 120 for encrypting the collected information and/or user identifiers.

In an example, a user makes a purchase at a retail location. Information related to the purchase is transmitted to the CRM server 122. The information may include an identifier of the user, such as an email address and/or a phone number. The CRM server 122 transmits the collected user information to the management server 108. The CRM server 122 also transmits the email address and/or phone number. The management server 108 and/or a DMP references the email address and/or the phone number to other encrypted identifiers that are associated with a user's online presence (i.e., data onboarding). For example, the user's email address may be indexed to an encrypted identifier, which enables comparison to an email address provided in association with an offline purchase. After the association, the encrypted user information may be processed by the management server 108 and/or the data processor 109 for classification and/or assigning the encrypted user identifier (and/or the encrypted email address) to one or more sections or labels such that the user's offline purchases are also considered.

In some embodiments, the CRM server and/or the providers 104/106 may be associated with (i) a customer data platform ("CDP") used to unify online and offline user/customer information, and/or (ii) an existing user database. The unified user information may be encrypted in addition to one or more identifiers for transmission to the management server 108, which encrypts the one or more identifiers. Alternatively, the management server 108 encrypts the user information and the identifier that is received from the CDP.

The example data collection application 120 operates based on one or more instructions stored in a memory of the user terminal 110, and is configured to collect a user's information. In some embodiments, the application 120 may be embedded or configured as a plug-in (e.g., a software development kit ("SDK") or a JavaScript code) into a web browser (or specific application) operating on the user terminal 110. In other embodiments, the application 120 may be a stand-alone application 120 configured to monitor web usage in addition to usage of third-party content applications. The data collection application 120 encrypts certain usage information and transmits the encrypted information to the management server 108. To collect a user's information, the application 120 is configured to read HyperText Markup Language ("HTML") and/or Cascading Style Sheets ("CSS") code. The tags may identify categories of information displayed by a webpage, such as a category of a product or descriptors of a webpage. The collection application 120 may also collect information regarding specific links selected by a user, for example, to a particular product and/or whether a user started/completed a checkout for one or more products or any interaction with services delivered by the application 120 or another application on the user terminal 110. The tags of the visited pages are combined with metadata, such as timestamps, into a history file or data structure. When an advertisement is requested, the application 120 may be configured to transmit contextual tags used in a bid request/request proposal to enable an advertisement to be served based on a webpage that is currently visited and/or a format of the inventory requesting an advertisement.

In some examples, the application 120 may also record a user's engagement with advertisements. The engagement may include selecting an ad, watching an ad, purchasing a product provided by an ad, etc. The application 120 may encrypt data related to an ad's performance and send the encrypted data to the management server 108, which routes it to the DSP and/or the SSP 102 and/or the providers 104/106 to improve or refine crypto-calculation models for the user targeting (or group of users).

In some examples, the application 120 is configured to apply category rules to the collected information. The application 120 may create, for example, a taxonomy for the user for each pre-defined category. The taxonomy may be specified in a vector or a sparse vector, which is encrypted and transmitted to the management server 108 and/or the data processor 109. The application 120 may be configured to add noise in the form of null or zero-value vectors for a sparse vector to make it more difficult for a party to determine categories associated with the user.

Profile Creation/Advertisement Targeting Embodiment

Figure 2:
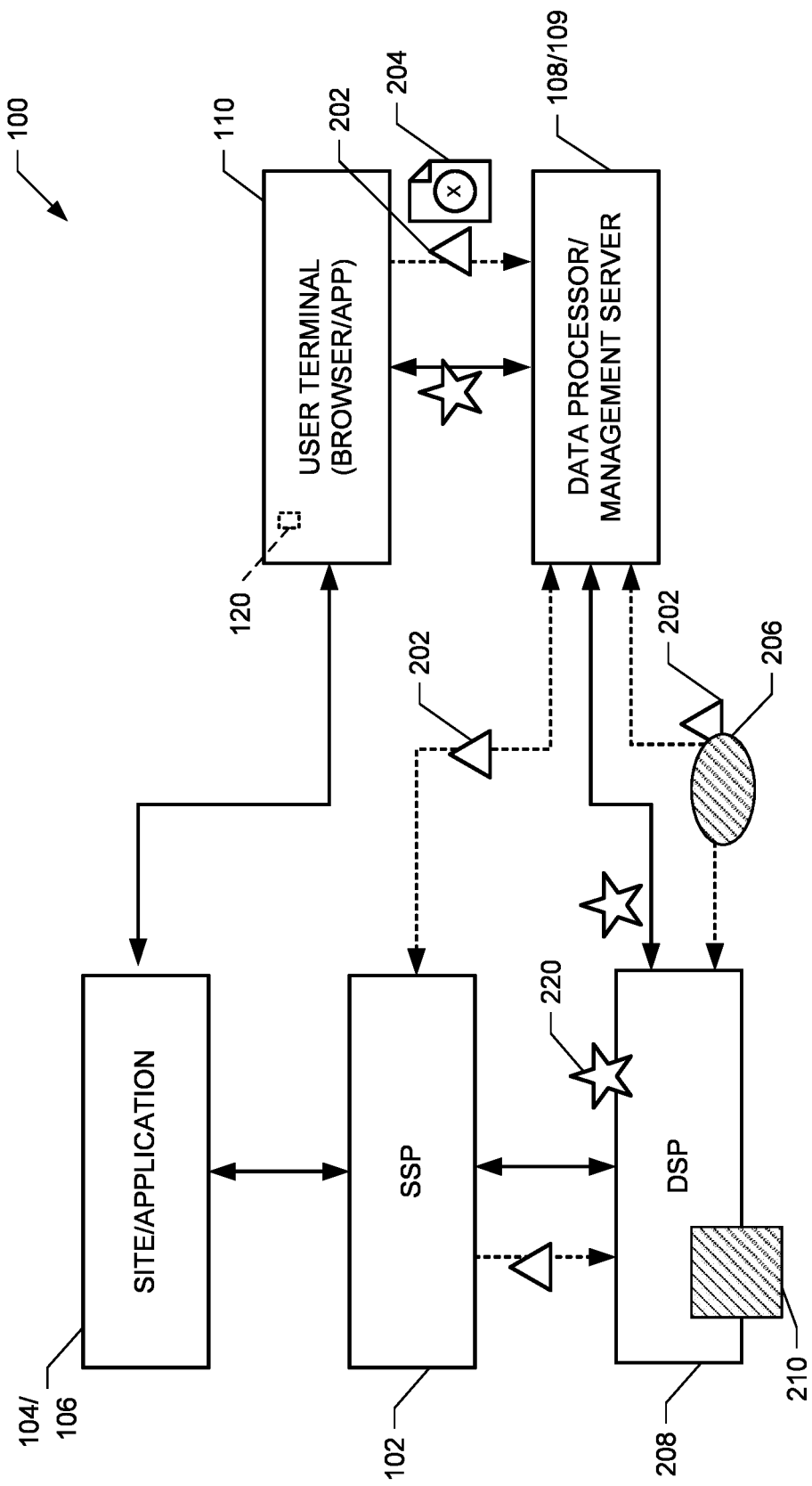
FIG. 2 shows an example diagram of the system of FIG. 1 for group profile creation and advertisement serving, according to an example embodiment of the present disclosure.

FIG. 2 shows an example diagram of the system 100 of FIG. 1 for group profile creation and advertisement serving, according to an example embodiment of the present disclosure. In the illustrated example, the application 120 (e.g., an SDK or JavaScript code) is installed on the terminal 110 via a webpage, app store, and/or the management server 108. In other examples, the application 120 may be installed from a webpage hosted by the provider 104/106 or another application installed on the terminal 110. In these other example, the application 120 may be a plug-in software application. The application 120 is assigned a unique identifier 202 for the user (e.g., the terminal 110). The application 120 may also assign a unique or dynamic identifier to the user and/or the terminal 110.

The application 120 installs a cookie (e.g., a glazed cookie that may call a secure and anonymizing server, such as the management server 108) that uses javascript code (or similar code) or SDK (e.g., a glazed SDK that calls a secure and anonymizing server, such as the management server 108) to collect user browser/navigation and/or application usage information. The collected information may include tags and/or metadata from visited webpages. In an embodiment, the application 120 transmits identifier 202 and encrypts and transmits the collected information, shown as information 204, to the management server 108, which encrypts the identifier 202. The data processor 109, in communication with the management server 108, applies rules or other data classification routines to the encrypted collected information to create a vector or sparse vector for the encrypted identifier 202.

In some embodiments, the management server 108 is configured to re-encrypt or trans-cipher the information 204 to homomorphic encryption without having to decrypt the data. In other embodiments, the application 120 may use a different key for each instance of information 204 transmitted or each web browsing session or webpage visited. The use of different keys at the terminal 110 by the application 120 prevents a third-party from being able to identify an origination or contents of the information 204. The encrypted information accordingly comprises alphanumerical encrypted data related to a vector that is indicative of a user's browsing or application usage. The application 120 transmits the identifier 202 in conjunction with the encrypted information to identify a source of the encrypted information.

In the illustrated example, the management server 108 is configured to remove or otherwise delete IP addresses or any other personal identifier that is received with the identifier 202 and/or the information 204. In some embodiments, the identifier 202 may not be transmitted with the information 204. Instead, the management server 108 deletes and replaces the IP address (or other identifying information that is transmitted with the information 204) with the identifier 202.

The management server 108 provides the data processor 109 with the encrypted information 204 and the identifier 202. The data processor 109 manages a data management platform ("DMP"), which is similar to a customer relationship manager, but for online user/customer data. The data processor 109 uses the DMP to organize the encrypted data for customization or marketing purposes. Specifically, the data processor 109 is configured to apply one or more rules, queries, (e.g., rules/queries that define an API), or other classification algorithms to the encrypted data using, for example, homomorphic calculations. The rules and queries define criteria for different categories. For example, the rules may specify keyword or tags that are referenced to a certain category. In an example, the data processor 109 may match encrypted keywords or tags of a webpage showing women's sports shoes with prices between $20 and $35 to a category for shoes→sports shoes→women→price [20, 35]. Once a match to a category is made, the example data processor 109 is configured to increment a value for this category within an encrypted vector (associated with the identifier 202 for the user) at a coordinate or point that corresponds to the matching category.

In another example, a user uses a terminal 110 to visit a webpage for travel to Hawaii for seven days and view a hotel website with a rate of $500 per night. Depending on the category organization, the example application 120 encrypts information related to Hawaii, seven day duration, and $500 per night price. The application 120 may include categories or labels with the encrypted information. In some examples, the application 120 may use javascript tags for the encrypted information and/or labels. The data processor 109 is configured to use the labels and rules to increment values in a vector corresponding to a Hawaii travel destination subcategory (or more generally a travel subcategory), a $500 price per night subcategory (or price range), and a 7 day duration subcategory (or day range).

In instances where the application 120 applies the rules or queries locally in the user terminal 110, the data processor 109 analyzes the vector to determine which values within a managed user vector are to be incremented or otherwise modified. The results from updating the vector cause a taxonomy to be updated for the user of the terminal 110 for each pre-defined category that is indicative of a user's web browsing activity. In other words, the application 120 at the terminal 110 creates the encrypted vectors, where each coordinate is individually encrypted or the coordinates are encrypted together.

After a vector is created and/or updated for the identifier 202 of FIG. 2, the data processor 109 reverses the data. Instead of providing vectors for each identifier, the data processor 109 creates a list of identifiers for each category specified by the vectors. The data processor 109 may transmit the categories and identifiers, as information 206 to a DSP 208. In other instances, the data processor 109 creates a profile by creating groups of users by combining one or more related categories or selecting users that are contained within one or more categories. For example, a profile may be created for women's sports shoes and athletic wear that would contain identifiers of users that visited both, sports shoe webpages and athletic wear webpages. The profile is transmitted by the data processor 109 as the information 206 shown in FIG. 2. In some embodiments, the data processor 109 may create profiles for certain dates/times or ranges of dates/times from when encrypted information is received (or timestamped).

In the illustrated example, the DSP 208 uses the information 206 to create one or more advertising campaigns or targets 210. The DSP 208 is configured to run an online advertising campaign for advertisers. The DSP 208 is accordingly configured to purchase through real-time bidding, inventories of advertisement space from SSPs, which manage online editors and inventories for advertisement placement within the content provided by the providers 104 and/or 106.

Figure 3:
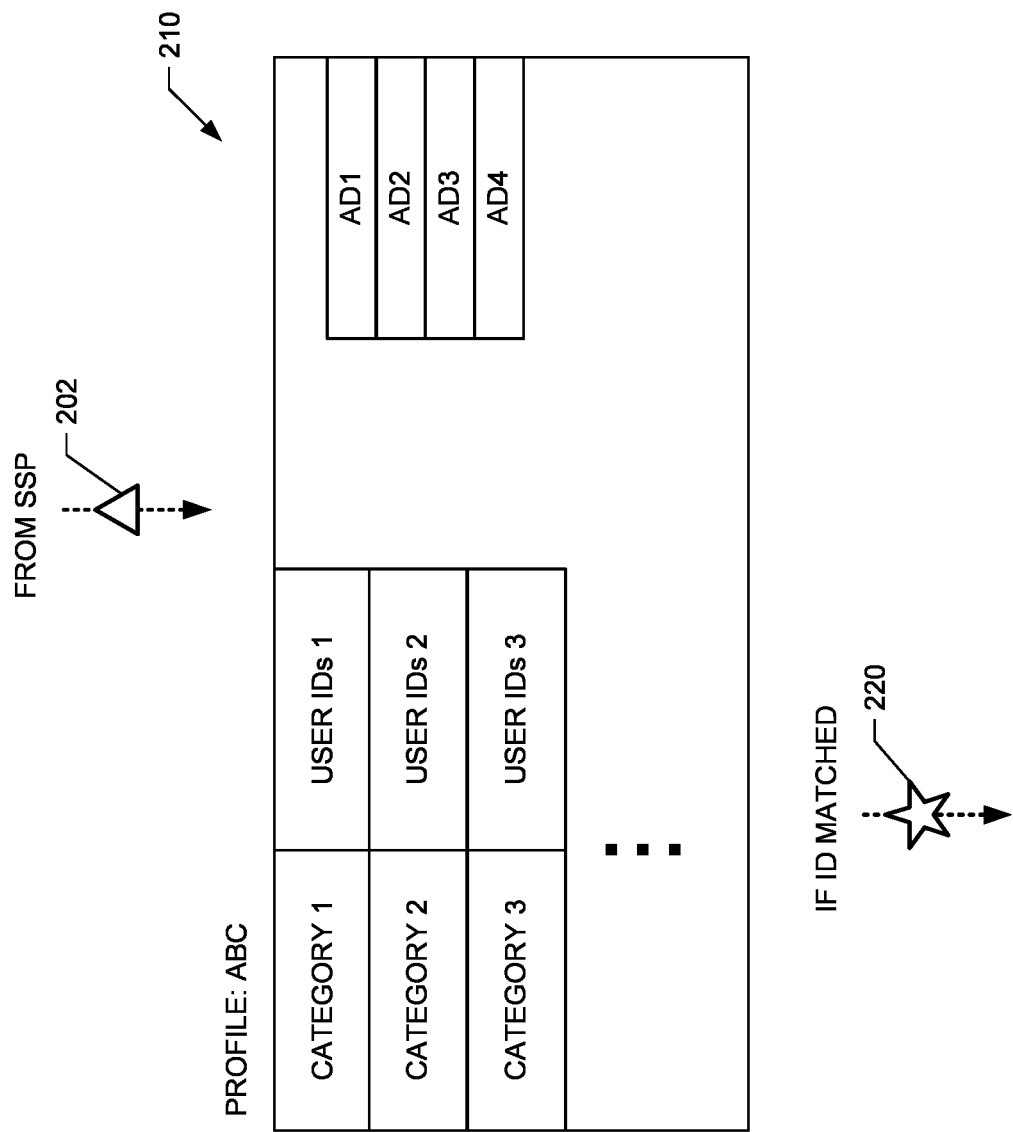
FIG. 3 shows an illustration of an advertisement campaign of FIG. 2, according to an example embodiment of the present disclosure.

FIG. 3 shows a diagram that is illustrative of the advertisement campaign 210 of FIG. 2, according to an example embodiment of the present disclosure. In this embodiment, the campaign 210 includes an aggregation of, for example, three categories and their corresponding list of encrypted user identifiers. For example, Category 1 comprises first list of user identifiers and a Category 2 comprises a second list of user identifiers. The campaign 210 also includes advertisements selected for the campaign by the DSP 208, and may include one or more default advertisements if a user identifier cannot be matched for serving. The campaign may specify that a first advertisement or a second advertisement may be selected for user identifiers that correspond to Category 1. In other examples, the campaign 210 may comprise a list of user identifiers that are present within each of a number of specified categories or a combination of aggregation and overlap of user identifiers.

Returning to FIG. 2, the illustration also shows a process flow for serving an advertisement to the user terminal 110. When a user visits a webpage or uses an application, the application 120 transmits bid request contextual information and the identifier 202 to the management server 108. The management server 108 encrypts the identifier 202 and filters the bid request information (limit precision of geolocation data and remove personal information). The management server 108 then transmits the filtered bid request contextual information and the encrypted identifier 202 to the SSP 102. In other examples, the management server 108 encrypts and transmits the identifier 202 to a SSP 102 that is in charge of monetizing the inventory of the website or application that is being visited by the user. The message from the management server 108 with the identifier 202 provides an indication that the user needs an advertisement served. The example SSP 102 communicates the encrypted identifier 202 to the DSP 208. In some embodiments, the DSP 208 receives the encrypted identifier 202 from the SSP 102 and/or the data processor 109. The DSP 208 compares the received encrypted identifier 202 to the list of encrypted identifiers in, for example, the campaign 210 shown in FIG. 3. In some embodiments, the DSP 208 may manage multiple profiles and/or campaigns and accordingly compare the identifier 202 to each of the profiles and/or campaigns. In some embodiments, the data processor 109 may maintain a list of identifiers. In these embodiments, the DSP 208 may transmit a search or query to the data processor 109 regarding a particular label or category. In some examples, the DSP 208 receives from the SSP 102 an encrypted identifier and checks with a secure matching function if it is included in an encrypted list corresponding to a category.

In some examples, the DSP 208 receives from the SSP 102 an encrypted identifier 202. The DSP 208 checks a secure matching function or operation to determine if the encrypted identifier 202 is included within an encrypted list of identifiers corresponding or stored in association with a category. The DSP 208 may also select an advertisement 220 based on bid request contextual parameters, a history of campaign results, and/or campaign budget and target parameters using algorithms, such as those described above.

As shown in FIGS. 2 and 3, if a match is made, the DSP 208 selects one of the advertisements from the campaign 210. The DSP 208 may be provisioned to encrypt the selected advertisements, shown as advertisement 220. The DSP 208 transmits the encrypted advertisement 220 to the SSP 102, which transmits it to the management server 108.

The management server 108 is configured to transmit the advertisement 220 to the terminal 110 for display in the website or application. The management server 108 may also be configured to perform visibility checking by receiving feedback from the application 120 as to whether the user clicked on the advertisement or purchased a product/service related to the advertisement. The application 120 may encrypt the feedback, which is transmitted to the management server 108 and/or the data processor 109 or DSP 208. If the DSP 208 cannot make a match, the DSP 208 may transmit a default advertisement and/or not participate in the bidding.

As shown in FIGS. 2 and 3, the user's personal data is anonymized because the data processor 109 only manipulates encrypted vectors and the DSP 208 has a list of encrypted user identifiers corresponding to categories. The SSP 102 only passes encrypted identifiers and (encrypted) advertisements. Both the DSP 208 and the SSP 102 cannot re-identify the user data because (i) they do not possess the user's key for decryption, (ii) the identifiers are dynamic and encrypted, and (iii) the management server 108 encapsulated the advertisement bidding process by not allowing access to IP addresses and is the only point of access for advertisements to the terminal 110.

Example Rules and Categories

Figure 4A:
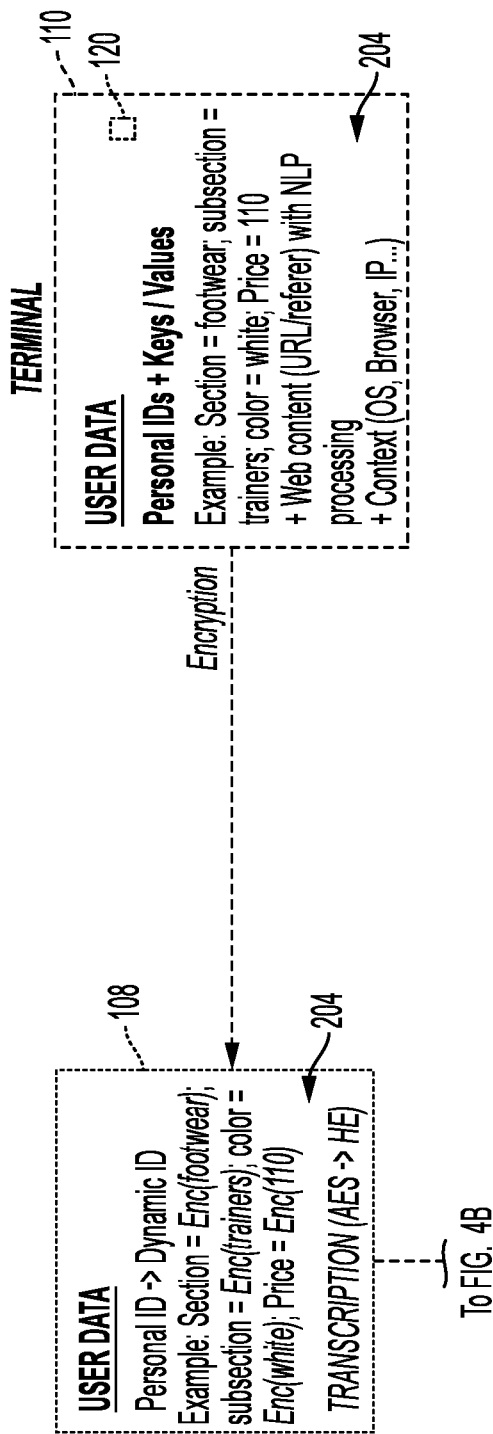
FIG. 4 shows a diagram that illustrates how rules and categories/sections are used to create encrypted vectors for a taxonomy, which are indicative of a user's browsing history/navigation and/or application usage, according to an example embodiment of the present disclosure.
Figure 4B:
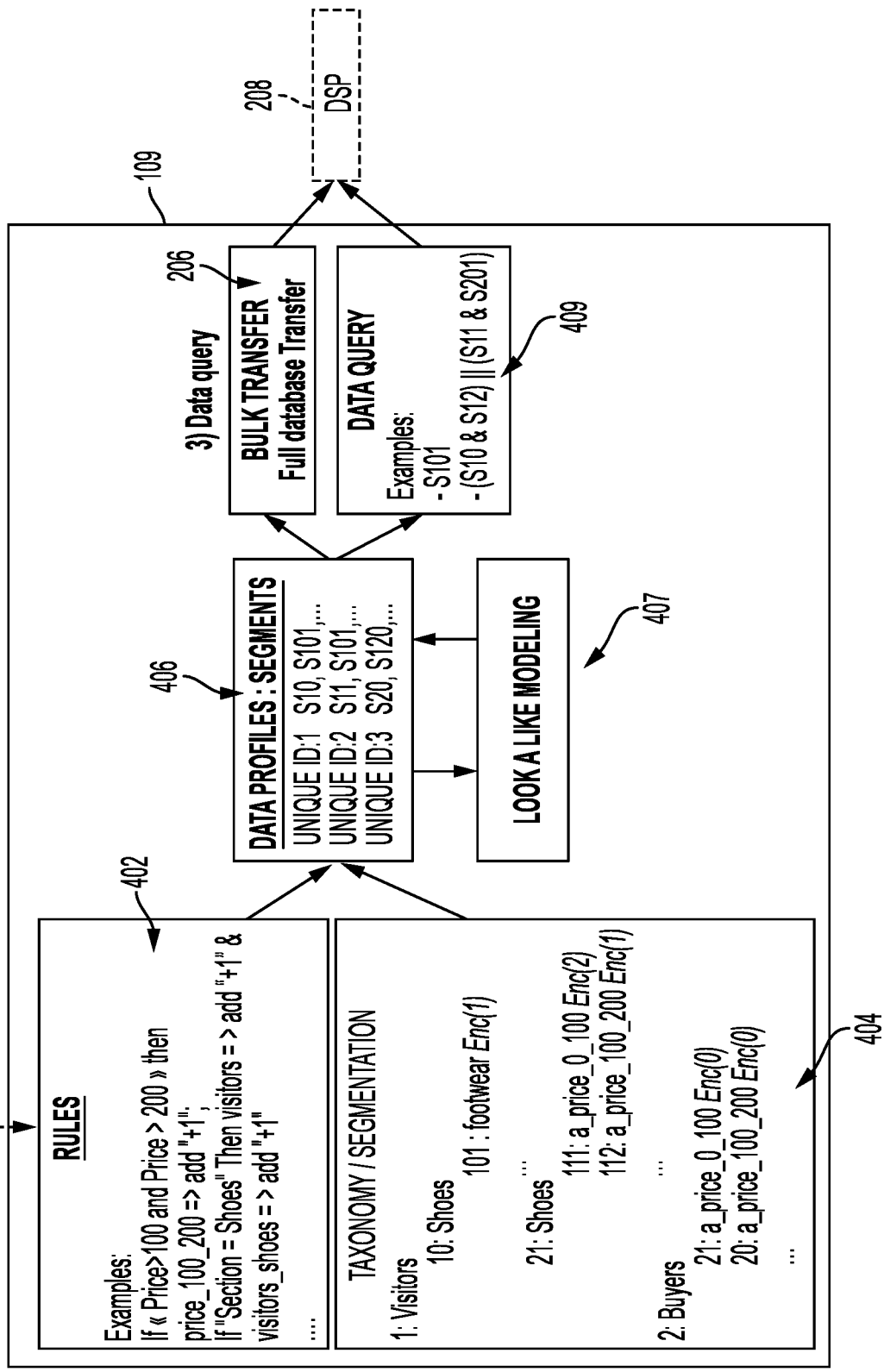

FIG. 4 illustrates a diagram showing how rules and categories/sections are used to create encrypted vectors indicative of a user's browsing history/navigation and/or application usage, according to an example embodiment of the present disclosure. In the illustrated example, the application 120 at the terminal 110 collects information 204 related to a user's web browsing, navigation, and/or application usage. The information 204 includes keys/values (e.g., tags) related to the webpage or application, including section information. The application 120 may determine the section information based on metadata associated with the webpage, information provided by a website host regarding a hierarchy of webpages (including labels), user-selected filtering information, or any other information that is indicative of the text, images, etc. displayed on the webpage/application. After determining the section, the application 120 may store the information in a hierarchy based on the section information. The hierarchy may be based on a category hierarchy defined by one or more rules, queries, and/or classification algorithm at the data processor 109. In the illustrated example, the application 120 stores webpage section information as "Section=footwear; subsection=trainers; color=white; price=110".

The information 204 may also include, for example, web content such as a uniform resource locator ("URL"), referrer, actions performed, etc. and/or context, such as an operating system of the terminal 110, a web browser type, and/or an IP address assigned to the terminal 110. The information 204 may further include a personal identifier, such as a MAC address, a username, dynamic identifier, etc. associated with the user.

The example application 120 is configured to encrypt all or at least some of the keys and values of the information 204, as shown in FIG. 4. The application may use homomorphic encryption, AES encryption, or any other type of encryption. As illustrated, the application 120 encrypts keys along with the associated values for color and price in the section information. The application 120 also encrypts "Section", "Subsection", and section information "footwear" and "trainers". In other embodiments, this section information may be unencrypted or all of the information 204 may be encrypted.

The information 204 is transmitted from the application 120 to the management server 108. As discussed above in connection with FIG. 2, the management server 108 is configured to remove personal identifying information and replace it with a unique or dynamic identifier. The server 108 is also configured to ensure the information 204 is protected via homomorphic encryption. In an embodiment, the server 108 may use trans-cyphering to convert all or at least some of the information 204 from AES encryption to homomorphic encryption, except for the personal identifier, which is encrypted with another encrypted scheme. The management server 108 may also remove or delete other of the information, as shown in FIG. 4, including web content, context, tags, etc. In other examples, the application 120 may be configured not to transmit or otherwise acquire the web content, context, etc.

The management server 108 transmits or otherwise provides the data processor 109 with all or at least some of the information 204 that is protected via homomorphic encryption. The data processor 109 is configured to apply rules 402 (or a classification algorithm) over the encrypted information 204 to organize it into information for a vector related to the user. For instance, if a user visited a webpage that is hosted by a shoe retailer, each section or webpage of the website visited by the user is associated by the data processor 109 to a category in a taxonomy. The rules 402 are associated with one or more sections/labels of the information 204. The rules 402 are configured to determine whether a section, label, and/or value are within a predefined range, threshold, and/or match one or more keywords. If a rule is satisfied, a dynamic identifier is added to the list of the corresponding one or more categories. The rules 402 may comprise a single label or section, or a combination of labels, sections, and subsections. Each rule may correspond to a category in the taxonomy.

In some embodiments, the taxonomy may be replaced by a functional database structure, such as a structured query language ("SQL") database and/or other database type or combination of database types. In these embodiments, the data processor 109 is configured to apply one or more queries on the encrypted usage information to at least one of compare, group, classify, order, or score the encrypted usage information. At least some of the one or more queries may specify an occurrence threshold, a value range, or a label value.

In the illustrated example, the data processor 109 determines that the categories of "price_100_200", "visitors", "visitors_shoes" are to be incremented based on values or section information (e.g., price of 110 and "section=shoes") matching the defined ranges or matching keywords. The data processor 109 uses homomorphic calculations to determine how categories are incremented based on encrypted values, labels, and/or section information. FIG. 4 includes a data structure 404 that illustrates the category taxonomy and how the encrypted values and section information are applied to the individual categories. In some embodiments, the data structure 404 is illustrative of a vector data structure 406 that stores the same encrypted category information. In some embodiments, the vector data structure 406 may store sparse vectors for the users. The sparse vector may identify the coordinates in which a non-zero value is present, and the values of the coordinates. In the illustrated example, the values of the sparse vector and coordinates may be encrypted.

The example data processor 109 is configured to reverse the data shown in the vector data structure 406. Instead of storing a vector or profile for each user, the data processor 109 stores, for each category, a list of the unique user identifiers that match the category. In some embodiments, the data processor 109 may have a threshold for each category to determine if a unique identifier is to be included. For example, the threshold may include an encrypted value of 5, which means, for example, that a user had to perform a certain action (e.g., visit a certain website or view a certain category of products) five different times to warrant being included in the category.

In some examples, the data processor 109 is configured to create profiles or user groups, shown as information 206. The profiles correspond to traits or histories for a certain advertisement, group of advertisements, or campaign, as discussed above in connection with FIG. 3. The data processor 109 may combine one or more categories to create a large user group of unique identifiers. In other examples, the data processor 109 may perform a routine, algorithm, etc. on the categories to determine resulting unique identifiers for a profile. The routines or algorithms may specify certain categories in which a user overlaps in conjunction with thresholds or weights.

The example data processor 109 is configured to perform look-a-like modeling 407. Additionally or alternatively, the data processor 109 may transfer the information 206 to the DSP 208 to enable the DSP 208 to make data queries (as shown as data queries 409) and enable the DSP 208 to create its own profiles.

Example Media Purchasing Embodiment

FIG. 5 shows a diagram illustrative of a procedure 500 for purchasing media, according to an example embodiment of the present disclosure. In the illustrated example, at a publisher/client provider 104 and 106, a publisher website includes advertising space information within or associated with a bid request, which routed to the management server 108 for de-identification. The management server also encrypts and/or makes a personal identifier dynamic. The encrypted identifier and then provided to the SSP 102. As discussed above, the SSP 102 is a supply-side platform used to sell advertising in an automated fashion. The SSP 102 is used by the website of the provider 104, 106 to help sell display, video, and/or mobile advertisements. The DSPs 208 interface with the SSP 102 to determine which ad is to be served to the website (or application) of the provider 104 and 106 in a cost-effective manner.

When a user visits the website (or the application) of the provider 104, 106, the application 120a, the management server 108, and/or the publisher website (or the application) of the provider 104/106 collects a unique identifier and/or context information (e.g., the information 204 of FIG. 2). The SSP 102 receives, from the management server 108, the encrypted identifier and the bid request—which is communicated to the DSPs 208. The DSPs 208 compare the encrypted identifier to one or more lists of encrypted identifiers that are attached or otherwise associated with campaign labels to identify matching encrypted identifiers. If there is a match, the DSP 208 checks the bid request's information against campaign criteria and identifies an advertisement or media to serve to the SSP 102. Then, the SSP 102 sends a message to an adserver publisher 502 for the display, video, or mobile ad. The DSP 208 or adserver publisher 502 may encrypt the received media or advertisement, which is transmitted to the management server 108, which safely and securely stores IP addresses for custom adserving. The management server 108 delivers the encrypted advertisement to the terminal 110 using a stored IP address, where the application 120 may decrypt the advertisement for display within the website or application. The management server 108 operates with the application 120 to perform visibility tracking regarding whether (or how long) the user viewed the ad or clicked-into the ad. The management server 108 receives the tracking information (which may be encrypted) from the application 120, which is transmitted to the DSP 208 that provided the advertisement. This provides anonymized feedback regarding an effectiveness of the advertisement and is used to track clicks for compensation.

Figure 6:
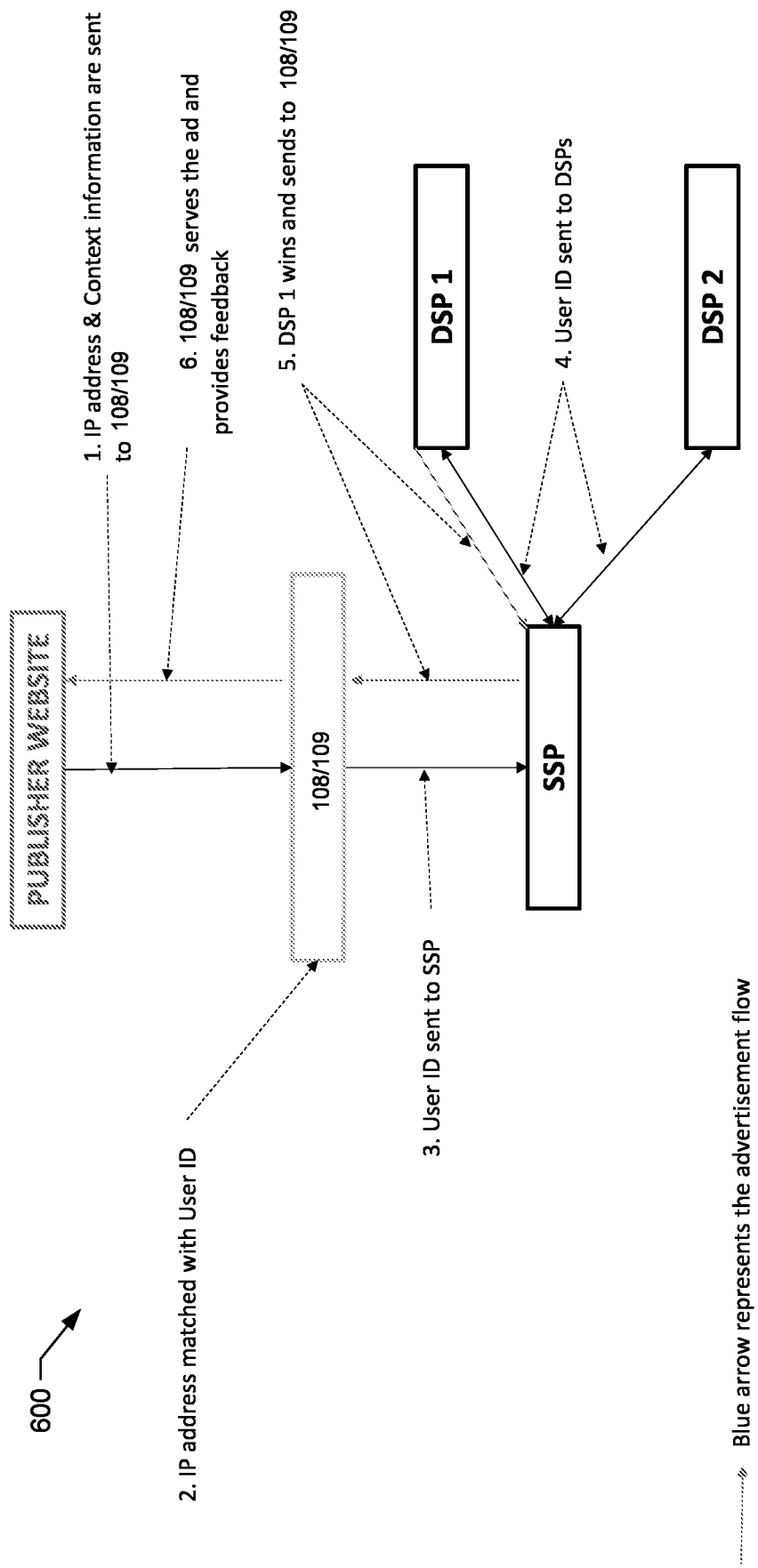

FIG. 6 shows a diagram that is illustrative of another procedure 600 for purchasing media, according to an example embodiment of the present disclosure. In the illustrated example, the data processor 109 and/or the management server 108 receive an IP address and context information from a publisher website and/or user terminal 110 regarding an advertisement to be served. The management server 108 and/or the data processor 109 matches the IP address with a unique user identifier. The management server 108 and/or the data processor 109 then sends the user identifier to an SSP, which sends the identifier to the DSPs to compete for ad placement. The example SSP selects a winning DSP and sends the advertisement to the data processor 109. The advertisement may be encrypted. The data processor 109 is configured to serve the advertisement to the publisher website and/or user terminal. In some instances, the data processor 109 decrypts the advertisement (using a key shared with the DSP). In other instances, the data processor sends the encrypted advertisement to the website or user terminal. In these other instances, the publisher or user terminal decrypts the advertisement for display/playing. In addition, the data processor 109 is configured to receive feedback regarding a user's interaction or viewing of the advertisement, which may be encrypted.

Data Collection Procedure Embodiment

Figure 7:
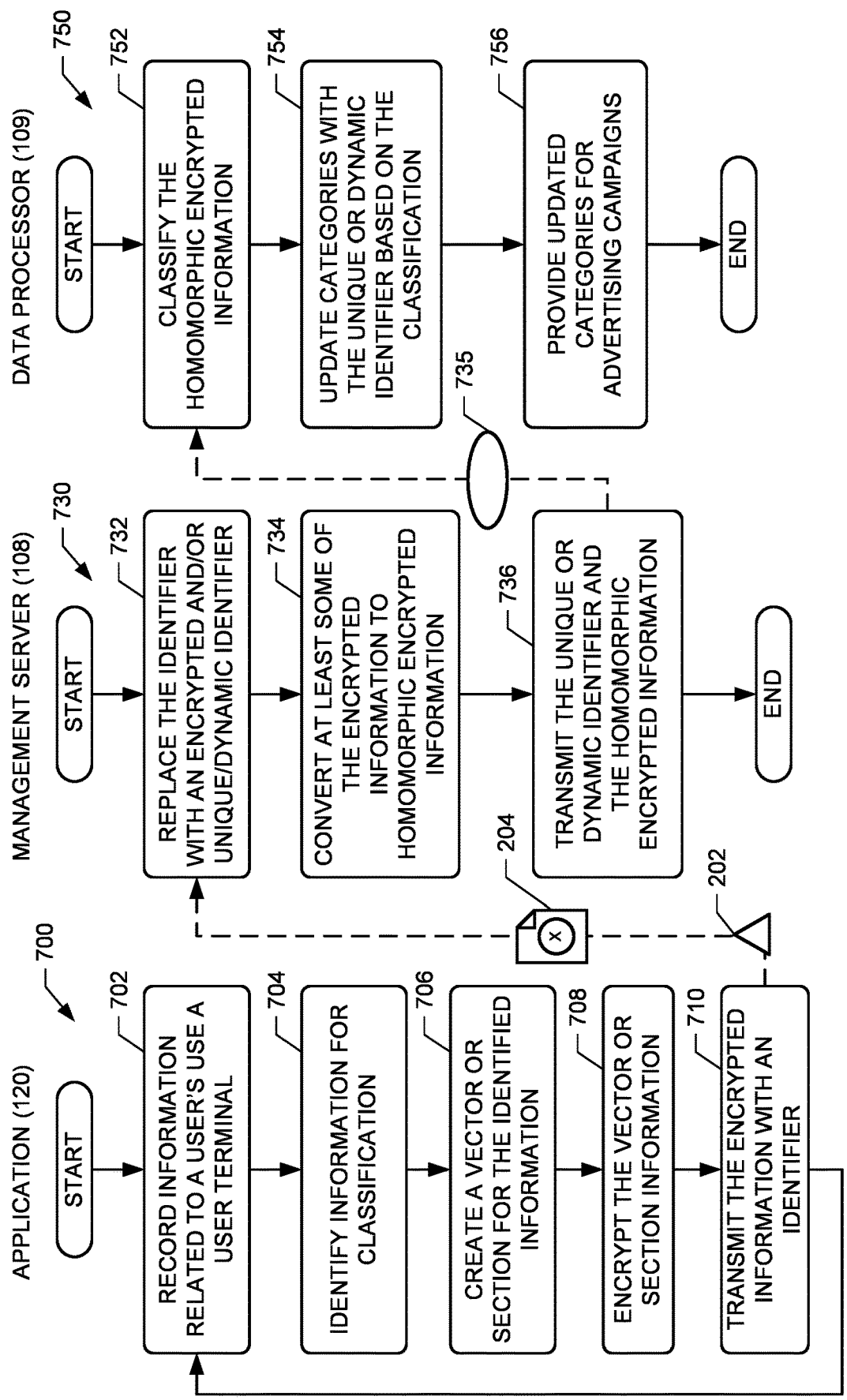
FIG. 7 shows a diagram of an example procedure configured to classify user information into one or more categories by performing computations on homomorphically encrypted data, according to an example embodiment of the present disclosure.

FIG. 7 shows example procedures 700, 730, and 750 for classifying use information for targeted advertising using homomorphic encryption, according to an example embodiment of the present disclosure. Although the procedures 700, 730, and 750 are described with reference to the flow diagrams illustrated in FIG. 7, it should be appreciated that many other methods of performing the steps associated with the procedures 700, 730, and 750 may be used. For example, the order of many of the blocks may be changed, certain blocks may be combined with other blocks, and many of the blocks described are optional. Further, the actions or steps described in procedures 700, 730, and 750 may be performed among multiple devices including, for example the application 120 on the user terminal 110, the management server 108 and/or the data processor 109. In some instances, the procedures 700, 730, and 750 are defined by machine-readable instructions (e.g., software) stored in a memory. When executed by a processor, the machine-readable instructions are configured to cause the operations described herein to be performed.

The example procedure 700 begins when the application 120 on the user terminal 110 collects information related to a user's web browsing, navigation, and/or application usage (block 702). The information may include keys/values (e.g., tags) related to the webpage or application, including section information. The application 120 analyzes the collected information to identify certain information for classification or sectioning (block 704). In some instances, the operations of collecting and identifying are combined such that the only information collected by the application 120 is the information needed for classification.

In some embodiments, the application 120 creates section information using metadata associated with the webpage, information provided by a website host regarding a hierarchy of webpages (including labels), user-selected filtering information, or any other information that is indicative of the text, images, etc. displayed on the webpage/application (block 706). In some instances, the application 120 stores the information in a hierarchy based on the section information. The example application 120 is configured to encrypt at least some of the section information (block 708). This may include encrypting just the data itself and/or labels or section identifiers for the data. The application may use homomorphic encryption, AES encryption, or any other type of encryption.

The application 120 transmits the encrypted information, as information 204 described above in connection with FIGS. 2 to 4 (block 710). The application 120 also transmits an identifier 202 with the encrypted information. The procedure 700 then returns to block 702 when the application 120 detects there is additional user information to collect.

It should be appreciated that in some embodiments, a CRM server for offline data or a DMP of the providers 104/106 for online data collects information related to user purchases or browsing. In these examples, the CRM server or DMP transmits the collected information and an identifier of the user for encryption on the management server 108. In some instances, the CRM server or the DMP includes the application 120 for encrypting and/or classifying/sectioning the collected user information.

Procedure 730 begins when the management server 108 receives the identifier 202 and the encrypted information 204 from the application 120. The management server 108 removes or replaces the identifier (including personal identifying information) with a unique or dynamic identifier (block 732). This may include encrypting the unique identifier. In instances where the identifier 202 already comprises a unique or dynamic identifier, this step can be omitted. The management server 108 trans-cyphers all or at least some of the information 204 into homomorphic encrypted information (block 734). This may include applying transcription to convert at least some of the information 204 from AES encryption to homomorphic encryption. If the application 120 already applied homomorphic encryption, this step may be omitted. In some instances, the management server 108 may remove or delete certain information provided in conjunction with or included within the encrypted information, such as unencrypted and/or encrypted labels, tags, context, web content, etc.

The management server 108 then transmits or otherwise provides the unique and/or dynamic identifier in addition to the homomorphic encrypted information in one or more messages 735 (block 736). The example procedure 730 then ends. The procedure 730 begins again when an identifier 202 and new information 204 is received from the same or a different application 120.

Procedure 750 begins when the data processor 109 receives the one or more messages 735 with the unique and/or dynamic identifier and the homomorphic encrypted information. In some embodiments, the data processor 109 may be combined with the management server 108 such that transmission of the messages 735 across the network is not needed. The data processor 109 uses one or more rules or queries (e.g., the rules 402) or a classification/scoring algorithm to classify the encrypted information (block 752). The classification may include creating a vector for the user using encrypted section information, where points along the vector correspond to different categories. Each point may include a separately encrypted value or character. In instances where the application 120 already classified the information by, for example, creating a vector, this operation may be omitted.

In an example, a vector may contain fifty points or coordinates that correspond to different categories or section information. Each point of the vector includes information that is indicative as to whether a user visited a webpage with corresponding category information (specified by headers, labels or rules), or a number of times a user visited a webpage with the category information. Each point may include an encrypted value, or all of the values may be encrypted together. The data processor 109 performs computations on the encrypted values of the vector points for comparison to the one or more rules or queries and/or for classification/labeling/scoring of the unique of dynamic identifier.

The data processor 109 then updates one or more categories with the encrypted and/or unique/dynamic identifier of the user based on the classification (block 754). The data processor 109 next provides the updated categories for advertising campaigns (block 756). As discussed in conjunction with FIG. 4, that may include transmitting the encrypted identifiers and categories to one or more DSPs 208. The example procedure 750 then ends. The procedure 750 begins again when addition messages 735 are received from the management server 108 that cause the data processor 109 to update the categories with identifiers.

Alternative Implementation Embodiment

Figure 8:
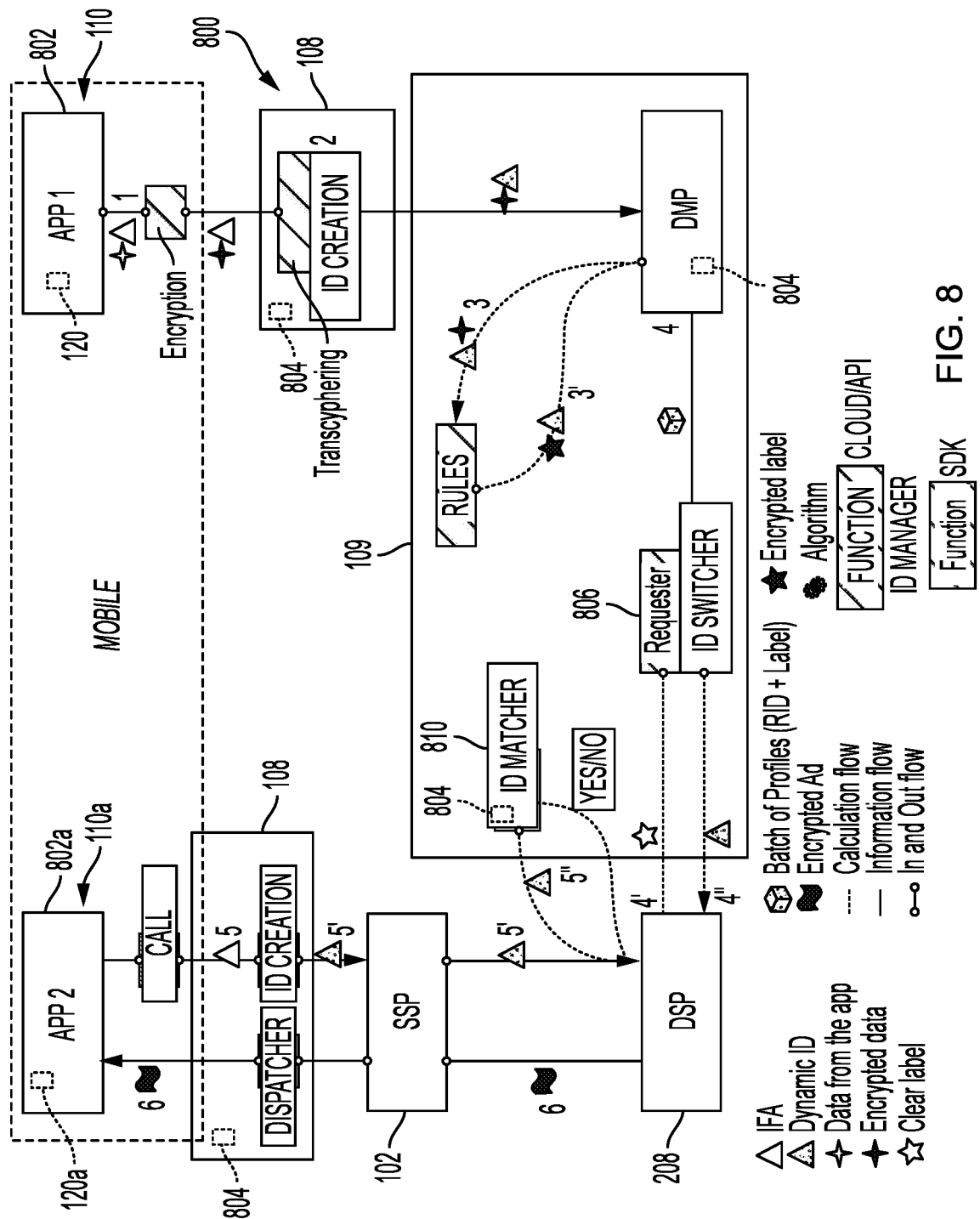
FIGS. 8 to 10 show diagrams illustrative of an implementation environment for collecting and using anonymized user data, according to an example embodiment of the present disclosure.

FIG. 8 shows a diagram of a content serving system 800, according to another example embodiment of the present disclosure. In the example system 800, the applications 120 operating on the user terminals 110 are configured to identify and/or collect application usage and/or web usage information. The applications 120 may also segment and analyze the collected information for classification. In the illustrated embodiment, the system 800 is configured to use multi-source cryptographically anonymized personal information. In addition to data collection, the advertisements themselves may also be protected using a cryptographic anonymization protocol.

In addition to the application 120, the example user terminal 110 includes a third-party application 802, which may include a retailer app, an information society app, a product manufacturer app, a service app, etc. The application 802 enables a user to have access to news content or browse/purchase goods or services. The application 120 is provisioned to collect data regarding usage of the application 802. In some instances, a provider of the application 120 and/or the application 802 may transmit a message to the application 120 that is indicative of the application 802 to be monitored.

The application 120 may include a SDK routine that is configured to collect, encrypt, anonymize, and/or route the data collected from the application 802 to the management server 108. In some instances, the application 120 may be a plug-in (or other enhancement) to the application 802 and/or operate in conjunction with the application 802 on the device 110. In some embodiments, the application 120 is configured to store a Symmetric Encryption System ("SES") (with random key) for encrypting the collected data.

At Event 1 shown in FIG. 8, the application 120 collects browsing or other usage data of the application 802. In addition, the application 120 encrypts the data using SES. In the illustrated example, the SES encryption/decryption key is only owned by the device owner. Since the SES-encrypted data will be later trans-cyphered, it is unnecessary for another party to own the key for decryption. In some embodiments, the application 120 may include a stream cypher encryption system for encrypting the collected data. A stream cypher encryption system is configured to encrypt streams of data and is symmetric for relatively quick encryption. Also at Event 1, the application 120 also collects a device identifier (e.g., "IFA"). The application 120 transmits the encrypted usage data and the device identifier to the management server 108 (e.g., a cloud-based secured proxy service or cryptographic hardware).

At Event 2, the example management server 108 is configured to trans-cypher the encrypted usage data from SES-encryption to homomorphic encryption, called HE or fully HE ("FHE"). It should be appreciated that the usage data is not decrypted. Trans-cyphering includes, for example, modifying the encrypted usage data with an encryption system E, from E(Data) into E'(Data) with E' another encryption system without deciphering it (and without any decryption key). The management server 108 may trans-cypher each encrypted character individually or trans-cypher a string of encrypted characters. At Event 2, the example management server 108 may also convert the IFA identifier via an encryption and/or hashing function F, giving F(IFA). The management server 108 then deletes the IFA identifier. The F function includes a mapping (hash-like) from a set S of possible IFA identifiers to a set S' of possible images, where S' is at least $2^{128}$ times larger than S. In an example, the IFA identifier may include a MAC address of the user terminal 110, which is deleted less than 15 minutes after collection by the management server 108.

In an example, the management server 108 may receive encrypted data d from the application 120 at the user terminal 110, which is encrypted using a stream cypher system ("SC"). The management server 108 is configured to use trans-cyphering to compute FHE(d) knowing only SC(d). In other words, the management server 108 can perform FHE(d) having only the SC(d), without any knowledge of d itself.

As shown in FIG. 8, at Event 2, the example management server 108 also encrypts the F(IFA) identifier with a general encryption ("GE") system or method, resulting in identifier GE(F(IFA)), which may be denoted as an ID ("RID"). As disclosed herein, RIDs are dynamic and may change at each query or action made by an entity of the data. It should be noted that GE is a nondeterministic encryption, where results from GE(F(IFA)) are different each time when the encryption is replayed, therefore making RIDs more dynamic. The number of encryptions of a given RID is at least $2^{256}$.

The management server 108 may use GE via a general encryption system or scheme for the F(IFA) identifier. This encryption system or scheme is asymmetrical and not deterministic (e.g., any identifier has at least $2^{127}$ different encryption possibilities). For each identifier, there is a particular encryption called canonical that the server 108 can retrieve via a decryption key. An encryption system is symmetrical when the encryption key is the decryption key.

An encryption system may be deterministic or not deterministic. In the first case, a given identifier that is encrypted many times is always encrypted with the same result. In the second case (not deterministic), this given identifier may be encrypted many times and will have many different encryptions. Of course, all these encryption possibilities have the same decryption result, namely the initial identifier.

As shown in FIG. 2, at Event 2, the management server 108 couples or otherwise creates a correspondence between HE(d) and the RID, which is transmitted to the data processor 109 as, for example, (RID, HE(d)). In some instances, the HE(d) and the RID are transmitted to the data processor 109 in a DMP.

Figure 9:
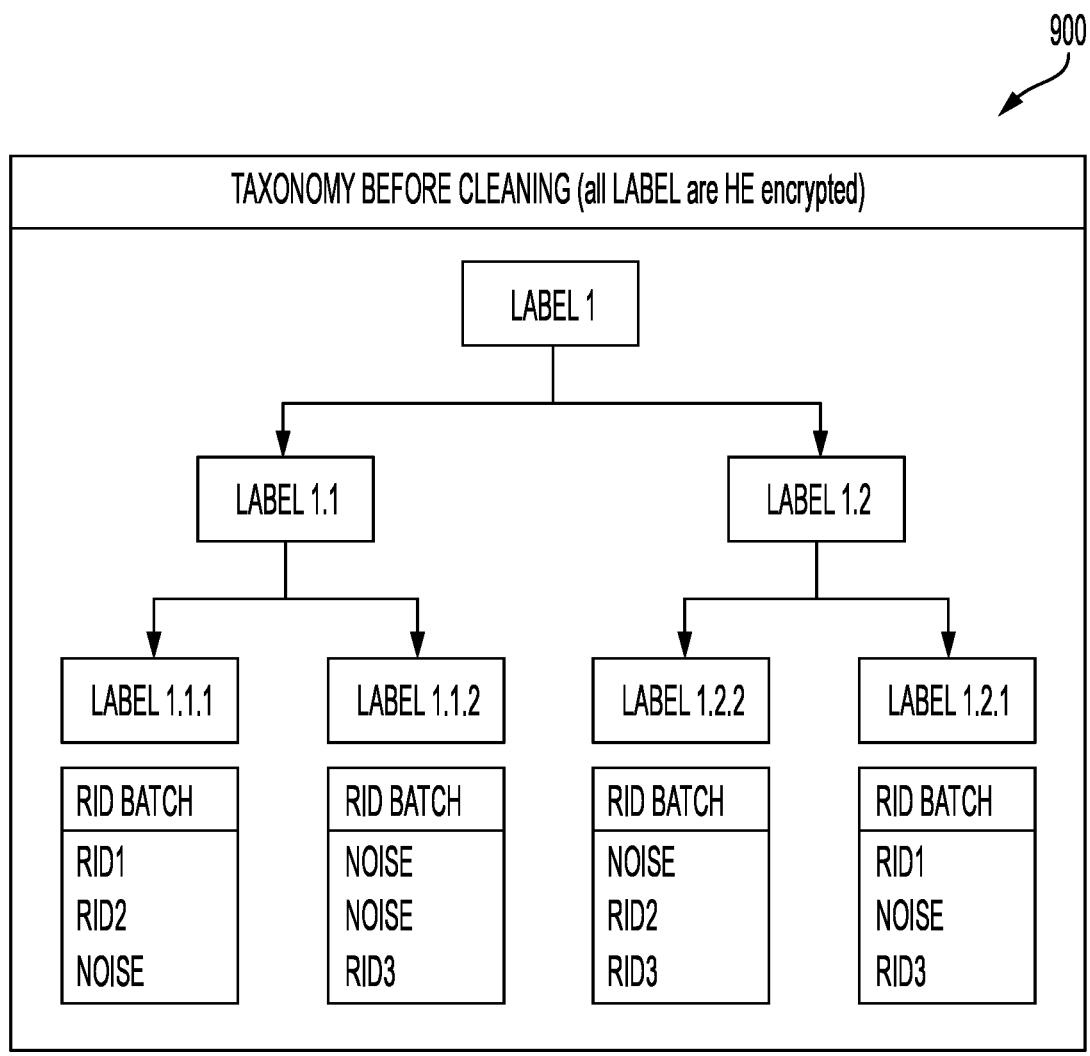

At Event 3 of FIG. 8, the data processor 109 is configured to receive the homomorphically encrypted data along with the RID. The data processor 109 is configured to segment the homomorphically encrypted data for inclusion within a taxonomy or other data structure, such as a SQL database. An example taxonomy 900 is shown in FIG. 9, according to an example embodiment of the present disclosure. The taxonomy 900 defines a hierarchy of node or data labels/categories for organizing usage of, for example, the application 802. Each lowest-level (and lower level) label includes a list of RIDs, that correspond to users that are related to that category (e.g., users that performed that action or viewed a product with the corresponding classification). The taxonomy 900 may be stored as a data structure in a memory that is accessible by the data processor 109.

The example data processor 109 is configured to use one or more internal rules or queries to compare the data HE(d) to labels within the taxonomy 900. In some embodiments, the node or data labels are encrypted using the same encryption scheme that is used for the encrypted usage information received from the management server 108. The rules may be applied by a hardware security module ("HSM") 804 that is separate from or included with the data processor 109 and/or the management server 108. The use of an HSM 804 enables the data processor 109 to keep the keys secure from inception and inaccessible at all times. The HSM 804 also controls functions that the data processor 109 can perform in order to guarantee and safeguard anonymization conditions. The HSM 804 can be parameterized jointly with a third party such as a regulatory body. The HSM 804 may be partitioned among the management server 108 and the data processor 109, as shown in FIG. 8. The HSM 804 performs the decryption internally and returns only encrypted RIDs for the data processor 109.

In the illustrated example, the data processor 109 transmits each of the nodes or data labels of the taxonomy 900 separately in addition to the encrypted usage information and the encrypted RID. The HSM 804 is configured to decrypt at least a node included with the encrypted usage information (if the node or data label is encrypted). In some instances, the HSM 804 may also decrypt internally all of the usage information. The HSM 804 also decrypts the node or data label of the taxonomy 900. The HSM 804 then applies one or more rules or queries (or other classification algorithms) to determine if the decrypted node or data label of the taxonomy 900 matches the node or data label of the usage information. If there is a match, the HSM 804 decrypts the RID, re-encrypts the RID, and transmits the RID back to the data processor 109 for inclusion within the matching node or data label of the taxonomy 900. In some instances, if there is a match, the HSM 804 may apply one or more rules or computations to the encrypted (or decrypted) usage information to determine if the RID should be associated with the node or data label of the taxonomy 900. The rules may include threshold values, ranges or values, etc. For example, a rule may specify that a RID may only be associated with a node or data label of the taxonomy 900 if the encrypted usage information corresponding to the matching node or data label has a value that is greater than an encrypted value of 50 or returns a result that is greater than 50 when a specified homomorphic computation is applied.

If the decrypted node or data label of the taxonomy 900 does not match the node or data label of the usage information, the HSM 804 encrypts a value of '0' (or similar null value) instead of the decrypted RID. The encrypted value of '0' is returned to the data processor 109 for or inclusion within the node or data label of the taxonomy 900 that was compared. The data processor 109 and HSM 804 continue to perform these comparisons for each of the nodes or data labels in the taxonomy 900 and for each of the nodes or data labels provided with the encrypted usage information.

The example data processor 109 of the illustrated example may operate via cloud services and one or more APIs for comparing and adding the RID under the HE(labels), shown in the taxonomy 900 of FIG. 9, with respect to their correspondence with the HE(d). Because the HSM 804 and/or the data processor 109 performs the matching and correspondence on usage data that is homomorphically encrypted (i.e., HE(d)), RID is added under the correct HE(label) and noise may be added under the other non-matching HE(labels) of the taxonomy 900. Also, since the result from a match in HE is encrypted, the RID and the noise are encrypted with GE. It is therefore impossible for the data processor 109 (or any other entity) to differentiate a RID from noise. The conditions for adding HE(labels) or noise may be performed by the data processor 109 according to conditional encryption, where the input: FHE(b), GE(d), and output: GE(0) if b=0 and a different GE-encryption of d if b=1. At this point in Event 3, the RIDs are stored under each corresponding HE(label), as shown in FIG. 9.

In some embodiments, the data processor 109 (and/or the management server 108) may be configured with a FHE system. In these embodiments, the fully homomorphic encryptions system is configured on the data processor 109 such that if there are two numbers a and b, the encryption of those numbers is FHE(a)+FHE(b)=FHE(a+b) and FHE(a)× FHE(b)=FHE(a×b). FHE enables the data processor 109 to perform computations over the encrypted data received from the application 120 and/or the management server 108.

In order to obtain a taxonomy with the RIDs without noise values, the data processor 109 of the illustrated example sends the RID batch (e.g., a batch of taxonomy profiles) to an internal or external HSM 804. The example HSM 804 may include a highly secured hardware device configured to perform one kind of computations and communicate to specified devices, such as the data processor 109. An independent entity may control the HSM 804, including the software and the installation of the software on the hardware. In some instances, after controls are performed on the HSM 804, the hardware is permanently locked and no entity has the ability to reprogram it. The hardware of the HSM 804 is configured to be resistant to any physical attack. For instance, if a malicious party attempts to open the hardware of the HSM 804, for instance, the HSM 804 is configured to destroy or erase the software so that its data becomes unreadable to anyone.

The example HSM 804 is configured with a decryption key for the GE. The HSM 804 performs cleaning with a function to eliminate the noise corresponding to null when decrypted. As discussed above, noise=GE(0), therefore GEˆ

(1)(GE(0))=0, which is removed from the RID batch by the HSM 804. The cleaning function may include an input: a set of GE(di), with the data including encryptions of 0, and an output: a list expunged from the encryptions of 0. The remaining data is changed into other encryptions of the same data. The computation may be done only if the input set contains at least a given number of elements (e.g. 2000 elements).

In other words, a node of the taxonomy 900 holds a noised RID batch. This RID batch may be cleaned by the HSM 804. To maintain user privacy, a noised batch of encrypted RIDs cannot be cleaned if it holds less than a given number of items (e.g. 2000 RIDs). The non-noised data is decrypted and re-encrypted to ensure RIDs are different after the HSM 804 exits the process. For instance, if the list to be cleaned is (16, 87, 65, 167, 379, 1812, 6543), and only 87 and 379 are encryptions of non-zero data, the returned list could be (2815, 213) corresponding to the re-encrypted values of 87 and 379.

Figure 10:
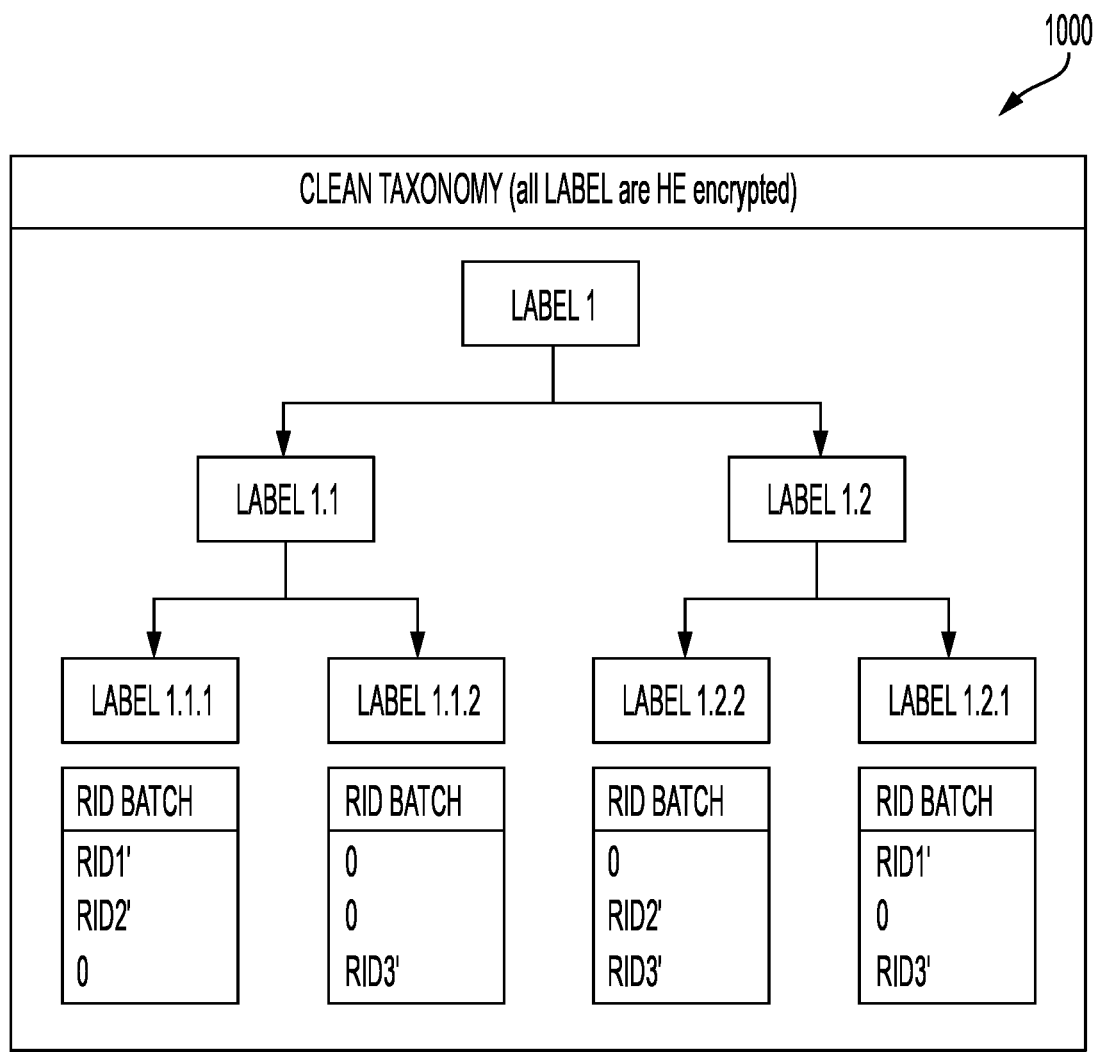

The example HSM 804 is configured to re-encrypt the RIDs to generate new values of RIDs (noted as RID'). FIG. 10 shows a taxonomy 1000 with the noise removed from the taxonomy 900 of FIG. 9. In addition, the RIDs have been re-encrypted to RID'. The HSM 804 transmits the encrypted RID data back to the data processor 109, as shown in FIG. 8. In this manner, the data processor 109 obtains a clean list of RIDs, but cannot link the RIDs from the cleaned RID batch with the RIDs from the old RID batch shown in the taxonomy 900 of FIG. 9.

The example system 800 of FIG. 8 also illustrates how an advertisement is served to the user terminal 110 and/or the user terminal 110a. In the illustrated example, the DSP 208 is configured with an advertising campaign. As shown at Event 4, the data processor 109 make its data accessible to the DSP 208 (i.e., the taxonomy 1000 including RIDs+HE (labels)) through the DMP. The data processor 109 or the DSP 208 select the RIDs corresponding to the label(s) concerning the campaign for serving target advertisements to those RIDs. To do so, the DSP 208 requests RIDs that are related to specified label(s).

In an example, the DSP 208 is interested in one label for a campaign. As such, the DSP 208 transmits a request message to a request API 806 of the data processor 109 to collect RIDs against a wanted label, referred to in this example as LABEL_TARGET. The API 806 receives the taxonomy (e.g., the taxonomy 1000 of FIG. 10) including the RID batch from the data processor 109 and performs a match to the specified label. The request involves the API 806 matching in HE (i.e., HE(LABEL_TARGET)?=HE (labels)). Therefore, the corresponding RID batch is GE encrypted and needs to be cleaned by the HSM 804. The HSM 804 returns a list of RID's (the previous RID's are decrypted and re-encrypted again) that correspond to LABEL_TARGET. The returned list of RIDs may be provided to the DSP 208, for later comparison of RIDs provided by the management server 108 for users that are to be served advertisements. Alternatively, the data processor 109 associates the returned list of RIDs to the advertising campaign related to the DSP 208. In this alternative embodiment, the data processor 109 receives RIDs of users to which an advertisement is to be served, and compares the RIDs to the returned list of RIDs that are associated with the advertising campaign.

At Event 5 a user of a user terminal 110a uses a publisher's app (e.g., app 802a) or visits a publisher's website. The application 802a operates with an SDK application 120a installed on the user terminal 110. The application 120a determines the application 802a is being used by a user and is to receive a targeted advertisement. The application 120a transmits a call message to communicate with a partner SSP 102. The call message may be to a cloud service related to the data processor 109 and/or the management server 108. The example application 120a sends to the management server 108, or a cloud provider, an IFA identifier of the user terminal 110 and/or the application 120a. The IFA identifier may be part of a bid request, which may contain geolocation data collected by the application 120a. The bid request and/or the geolocation data may have noise applied by the application 120a, the management server 108, and/or the data processor 109, as described herein. The management server 108, or cloud provider sends the IFA identifier to the HSM 804 of the data processor 109 to generate a RID_NEW in a similar manner as the RID was created at Event 2.

The example management server 108 transmits the RID_NEW to the SSP 102, which routes it to the DSP 208. The DSP 208 transmits the RID_NEW to the HSM 804 to perform a function to ask an operation at an ID matching API 810 to see if RID_NEW matches its batch of RID's. The operation may include an oracle function regarding GE(d) and GE(d'). The purpose of the oracle function is to say if d=d', with an output: a boolean d=d' (TRUE/FALSE). The DSP 208 receives a TRUE/FALSE answer for the RID matching test from the API 810. To do so, the HSM 804 decrypts the RID_NEW and RIDs from RID BATCH and checks if H(IFA)=H(IFA'). If YES, the DSP 208 sends back an advertisement to the SSP 102 that routes it to management server 108, and back to the user terminal 110 for display in the application 802a. The advertisement may be encrypted by the DSP 208, and decrypted at the application 802a using, for example, the SDK application 120a.

Figure 11:
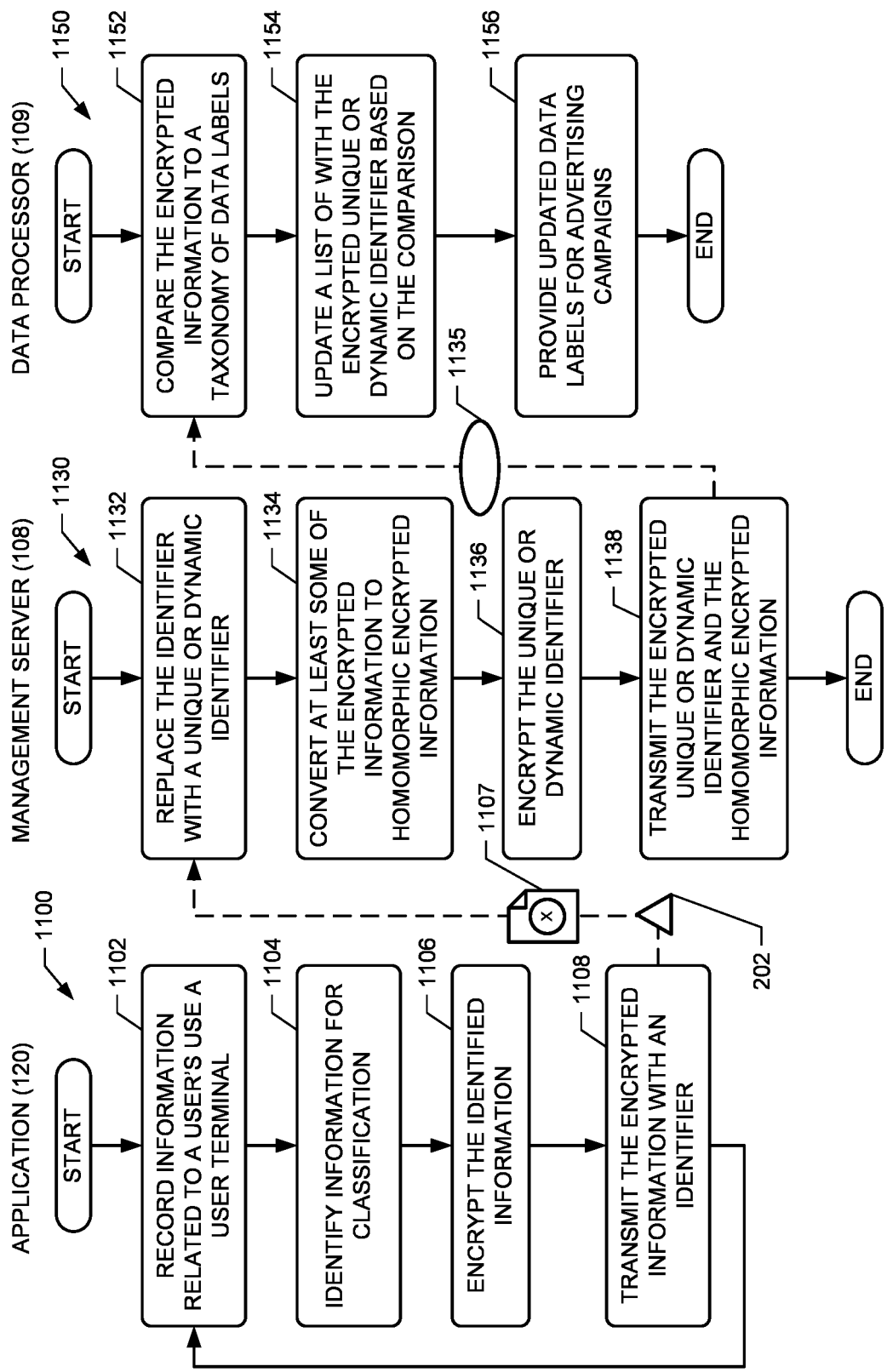
FIG. 11 shows a diagram of an example procedure configured to create lists of encrypted user identifiers for different data labels, according to an example embodiment of the present disclosure.

FIG. 11 shows example procedures 1100, 1130, and 1150 for applying encrypted user identifiers to one or more data labels in a hierarchy, taxonomy, or functional database of categories, according to an example embodiment of the present disclosure. Although the procedures 1100, 1130, and 1150 are described with reference to the flow diagrams illustrated in FIG. 11, it should be appreciated that many other methods of performing the steps associated with the procedures 1100, 1130, and 1150 may be used. For example, the order of many of the blocks may be changed, certain blocks may be combined with other blocks, and many of the blocks described are optional. Further, the actions or steps described in procedures 1100, 1130, and 1150 may be performed among multiple devices including, for example the application 120 on the user terminal 110, the management server 108 and/or the data processor 109. In some instances, the procedures 1100, 1130, and 1150 are defined by machine-readable instructions (e.g., software) stored in a memory. When executed by a processor, the machine-readable instructions are configured to cause the operations described herein to be performed.

The example procedure 1100 begins when the application 120 on the user terminal 110 collects information related to a user's web browsing, navigation, and/or application usage (block 1102). The information may include keys/values (e.g., tags) related to the webpage or application, including section information. The application 120 analyzes the collected information to identify certain information for classification or comparison to data labels (block 1104). In some instances, the operations of collecting and identifying are combined such that the only information collected by the application 120 is the information needed for classification.

In some embodiments, the application 120 creates section information using metadata associated with the webpage, information provided by a website host regarding a hierarchy of webpages (including labels), user-selected filtering information, or any other information that is indicative of the text, images, etc. displayed on the webpage/application. In some instances, the application 720 stores the information in a hierarchy based on a taxonomy or other functional database structure of data labels. The example application 120 is configured to encrypt at least some of the collected information (block 1106). This may include encrypting just the data itself and/or labels or section identifiers for the data. The application may use a homomorphic encryption scheme, a SES encryption scheme, an AES encryption scheme, or any other type of encryption.

The application 120 transmits the encrypted information 1107 (block 1108). The application 120 also transmits an identifier 202 with the encrypted information. The procedure 1100 then returns to block 1102 when the application 120 detects there is additional usage information to collect.

Procedure 1130 begins when the management server 108 receives the identifier 202 and the encrypted information 1107 from the application 120. The management server 108 removes or replaces the identifier (including personal identifying information) with a unique or dynamic identifier (block 1132). The management server 108 also converts at least some of the information 1107 into homomorphic encrypted information (block 1134). This may include applying transcription to convert at least some of the information 1107 from AES or SES encryption to homomorphic encryption. If the application 120 already applied homomorphic encryption, this step may be omitted. In some instances, the management server 108 may remove or delete certain information provided in conjunction with or included within the encrypted information, such as unencrypted and/or encrypted labels, tags, context, web content, etc.

The management server 108 also encrypts the identifier 202 using, for example, a GE method or system (block 1136). The management server 108 then transmits or otherwise provides the encrypted unique and/or dynamic identifier in addition to the homomorphic encrypted information in one or more messages 1135 (block 1138). The example procedure 1130 then ends. The procedure 1130 begins again when an identifier 202 and new encrypted information is received from the same or a different application 120.

Procedure 1150 begins when the data processor 109 receives the one or more messages 1135 with the encrypted unique and/or dynamic identifier and the homomorphic encrypted information. In some embodiments, the data processor 109 may be combined with the management server 108 such that transmission of the messages 735 across the network is not needed. The data processor 109 uses one or more rules, queries, or a classification algorithm to match the encrypted information to data labels in a taxonomy or other database, such as the taxonomy 1000 of FIG. 10 (block 1152). This may include decrypting encrypted data labels of the encrypted information for comparison to decrypted data labels of the taxonomy or other database. In some instances, the rules may provide an association between the encrypted information and the data labels. The association may be based on known locations of encrypted data relative to the specific data labels in the taxonomy, such as locations within an encrypted vector. In other instances, the rules define one or more homomorphic computations to be performed on the encrypted data for comparison to the data labels or values representative of the data labels. The rules may also specify thresholds, value ranges, keywords, etc. that must be satisfied by the comparison for the data processor 109 to determine a match. In other instances, the homomorphic encrypted-data may be accompanied by labels that are compared to the data labels.

After the comparison, the data processor 109 updates one or more data labels of the taxonomy or other database with the encrypted unique or dynamic identifier of the user (block 1154). The data processor 109 may also update non-matching data labels of the taxonomy with an encrypted null value. The data processor 109 next provides the updated data labels for advertising campaigns (block 1156). As discussed above, this may include transmitting the encrypted identifiers and/or data labels to one or more DSPs 208. Alternatively, the data processor 109 may receive an encrypted identifier from a DSP 208 (created by the management server 108 based on a unique identifier received from the application 120 or a SSP 102) and return data labels that includes a matching encrypted identifier. The data processor 109 may further receive data label information from the DSP 208 and return a list of corresponding encrypted identifiers to enable an advertisement to be served. The example procedure 750 then ends. The procedure 750 begins again when addition messages 1135 are received from the management server 108 that cause the data processor 109 to update the data labels with encrypted identifiers.

Conclusion

It will be appreciated that each of the systems, structures, methods and procedures described herein may be implemented using one or more computer program or component. These programs and components may be provided as a series of computer instructions on any conventional computer-readable medium, including random access memory ("RAM"), read only memory ("ROM"), flash memory, magnetic or optical disks, optical memory, or other storage media, and combinations and derivatives thereof. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Moreover, consistent with current U.S. law, it should be appreciated that 35 U.S.C. 112(f) or pre-AIA 35 U.S.C. 112, paragraph 6 is not intended to be invoked unless the terms "means" or "step" are explicitly recited in the claims. Accordingly, the claims are not meant to be limited to the corresponding structure, material, or actions described in the specification or equivalents thereof

The invention claimed is:

1. A cryptographic anonymization system comprising:
an application operating on a user terminal of a user or at a service provider, the application configured to:
collect usage information that relates to web or service usage of the user terminal from the user terminal or from an existing user database that stores at least one of online, offline, usage, purchase, commercial, or geolocation information,
encrypt at least some of the usage information using a first encryption scheme, and
transmit the at least some of the encrypted usage information and an identifier of the application, an identifier of the user terminal, or personal identifiers from the existing user database;
a management server communicatively coupled to the application via a network, the management server configured to:
trans-cypher the at least some of the encrypted usage information E(data) from the first encryption scheme to a second encryption scheme to create second encrypted usage information E'(data) without decrypting the at least some of the encrypted usage information by using the second encryption scheme to perform encryption on individual characters or strings of characters of the usage information E(data) that is encrypted using the first encryption scheme, wherein the first encryption scheme includes a Symmetric Encryption System ("SES") scheme or an Advanced Encryption Standard ("AES") scheme, and the second encryption scheme includes a homomorphic encryption scheme or a fully homomorphic encryption scheme, and
convert the identifier of the application, the identifier of the user terminal, or personal identifiers to a unique or dynamic identifier; and
a data processor communicatively coupled to the management server and configured to:
compare the second encrypted usage information to a taxonomy or other data structure of data labels, at least some of the data labels including unique or dynamic identifiers of other users,
for each match of at least some of the second encrypted usage information to a data label, add the unique or dynamic identifier to the matching data label,
add encrypted noise to at least some of the data labels for which a match was not made, and
provide at least one of the data labels or the corresponding unique or dynamic identifiers for serving advertisements to a third party.

2. The system of claim 1, wherein the usage information includes information that is indicative of at least one of web browsing, purchases, navigation, geolocation, application usage, online/offline service usage, user preferences, transaction data, credit card or payment information, offline purchases, commerce information, IoT/navigation related data, electrical grid balance information, polling data, political data, medical diagnosis/recommendation, or facial recognition feedback, and
wherein the usage information includes at least one of keys, values, metadata, labels, or tags related to a webpage, online services, offline purchases and actions, or an application.

3. The system of claim 1, wherein at least one of the application or the management server is configured to organize the at least some of the usage information into a data hierarchy or a functional database structure using specified section information.

4. The system of claim 1, wherein the management server is configured to convert the identifier to at least one of a unique or dynamic identifier by performing a function or an operation on the identifier.

5. A cryptographic anonymization system comprising:
an application operating on a user terminal of a user or at a service provider, the application configured to:
collect usage information that relates to web or service usage of the user terminal from the user terminal or from an existing user database that stores at least one of online, offline, usage, purchase, commercial, or geolocation information,
encrypt at least some of the usage information using a first encryption scheme, and
transmit the at least some of the encrypted usage information and an identifier of the application, an identifier of the user terminal, or personal identifiers from the existing user database;
a management server communicatively coupled to the application via a network, the management server configured to:
trans-cypher the at least some of the encrypted usage information E(data) from the first encryption scheme to a second encryption scheme to create second encrypted usage information E'(data) without decrypting the at least some of the encrypted usage information by using the second encryption scheme to perform encryption on individual characters or strings of characters of the usage information E(data) that is encrypted using the first encryption scheme, wherein the first encryption scheme includes a Symmetric Encryption System ("SES") scheme or an Advanced Encryption Standard ("AES") scheme, and the second encryption scheme includes a homomorphic encryption scheme or a fully homomorphic encryption scheme, and
convert the identifier of the application, the identifier of the user terminal, or personal identifiers to a unique or dynamic identifier; and
a data processor communicatively coupled to the management server and configured to:
compare the second encrypted usage information to a taxonomy or other data structure of data labels, at least some of the data labels including unique or dynamic identifiers of other users,
for each match of at least some of the second encrypted usage information to a data label, add the unique or dynamic identifier to the matching data label, and
provide at least one of the data labels or the corresponding unique or dynamic identifiers for serving advertisements to a third party,
wherein the management server, the data processor, or a hardware security module is configured to create a correspondence between the unique or dynamic identifier and the at least some of the second encrypted usage information.

6. The system of claim 1, wherein the data processor is configured to use one or more rules or queries for comparing the second encrypted usage information to the taxonomy or other data structure of data labels, at least some of the one or more rules specifying an occurrence threshold, a value range, or a label value.

7. The system of claim 1, wherein the management server is configured to encrypt and/or hash the unique or dynamic identifier.

8. The system of claim 7, wherein the data processor in combination with a hardware security module is configured to:
decrypt the noise and the encrypted unique or dynamic identifiers that are associated with the data labels;
remove the noise from the data labels; and
encrypt the unique or dynamic identifiers.

9. The system of claim 7, wherein the data processor in combination with a hardware security module is configured to decrypt and re-encrypt and/or re-hash the unique or dynamic identifier to make the unique or dynamic identifier dynamic after every query or calculation over the encrypted unique or dynamic identifier.

10. A cryptographic anonymization system comprising:
an application operating on a user terminal of a user or at a service provider, the application configured to:
  collect usage information that relates to web or service usage of the user terminal from the user terminal or from an existing user database that stores at least one of online, offline, usage, purchase, commercial, or geolocation information,
  encrypt at least some of the usage information using a first encryption scheme, and
  transmit the at least some of the encrypted usage information and an identifier of the application, an identifier of the user terminal, or personal identifiers from the existing user database;
a management server communicatively coupled to the application via a network, the management server configured to:
  trans-cypher the at least some of the encrypted usage information E(data) from the first encryption scheme to a second encryption scheme to create second encrypted usage information E'(data) without decrypting the at least some of the encrypted usage information by using the second encryption scheme to perform encryption on individual characters or strings of characters of the usage information E(data) that is encrypted using the first encryption scheme, wherein the first encryption scheme includes a Symmetric Encryption System ("SES") scheme or an Advanced Encryption Standard ("AES") scheme, and the second encryption scheme includes a homomorphic encryption scheme or a fully homomorphic encryption scheme, and
  convert the identifier of the application, the identifier of the user terminal, or personal identifiers to a unique or dynamic identifier; and
a data processor communicatively coupled to the management server and configured to:
  compare the second encrypted usage information to a taxonomy or other data structure of data labels, at least some of the data labels including unique or dynamic identifiers of other users,
  for each match of at least some of the second encrypted usage information to a data label, add the unique or dynamic identifier to the matching data label,
    provide at least one of the data labels or the corresponding unique or dynamic identifiers for serving advertisements to a third party,
    receive a target label from a data management platform ("DMP") server,
    determine a data label that matches the target label, and
    transmit encrypted unique or dynamic identifiers that are associated with the determined label to the DMP server.

11. The system of claim 1, wherein the management server is configured to:
  receive a second identifier of a second application, a second user terminal, or the user terminal;
  convert the second identifier to a second unique or dynamic identifier; and
  transmit the second unique or dynamic identifier to a demand-side platform ("DSP") server or a supply-side platform ("SSP").

12. The system of claim 11, wherein the system further includes the DSP server, the DSP server being configured to:
  receive encrypted user information and encrypted unique or dynamic identifiers from a data management platform ("DMP") server;
  determine data labels among the data labels that correspond to an advertising campaign of the DSP server;
  compare the second unique or dynamic identifier received by the SSP to the unique or dynamic identifiers of the determined data labels; and
  transmit an affirmative message to the SSP for serving an advertisement to the user terminal if the second unique or dynamic identifier matches one of the unique or dynamic identifiers of the determined data labels.

13. The system of claim 1, wherein the management server is configured to:
  receive two or more unique or dynamic identifiers of an application or a user terminal and one more or more unique or dynamic identifiers from another application, user terminal or third party database;
  link the identifiers together; and
  build an identity graph of the same user across different terminals, applications, and/or databases.

14. The system of claim 1, wherein the data processor is configured to apply one or more queries on the second encrypted usage information to at least one of compare, group, classify, order, or score the second encrypted usage information, at least some of the one or more queries specifying at least one of an occurrence threshold, a value range, or a label value.

15. The system of claim 5, wherein the usage information includes information that is indicative of at least one of web browsing, purchases, navigation, geolocation, application usage, online/offline service usage, user preferences, transaction data, credit card or payment information, offline purchases, commerce information, IoT/navigation related data, electrical grid balance information, polling data, political data, medical diagnosis/recommendation, or facial recognition feedback, and
  wherein the usage information includes at least one of keys, values, metadata, labels, or tags related to a webpage, online services, offline purchases and actions, or an application.

16. The system of claim 5, wherein at least one of the application or the management server is configured to organize the at least some of the usage information into a data hierarchy or a functional database structure using specified section information.

17. The system of claim 5, wherein the management server is configured to convert the identifier to at least one of a unique or dynamic identifier by performing a function or an operation on the identifier.

18. The system of claim 5, wherein the management server is configured to:
  receive a second identifier of a second application, a second user terminal, or the user terminal;
  convert the second identifier to a second unique or dynamic identifier; and
  transmit the second unique or dynamic identifier to a demand-side platform ("DSP") server or a supply-side platform ("SSP").

19. The system of claim 18, wherein the system further includes the DSP server, the DSP server being configured to:
  receive encrypted user information and encrypted unique or dynamic identifiers from a data management platform ("DMP") server;

determine data labels among the data labels that correspond to an advertising campaign of the DSP server;

compare the second unique or dynamic identifier received by the SSP to the unique or dynamic identifiers of the determined data labels; and transmit an affirmative message to the SSP for serving an advertisement to the user terminal if the second unique or dynamic identifier matches one of the unique or dynamic identifiers of the determined data labels.

20. The system of claim 5, wherein the data processor is configured to apply one or more queries on the second encrypted usage information to at least one of compare, group, classify, order, or score the second encrypted usage information, at least some of the one or more queries specifying at least one of an occurrence threshold, a value range, or a label value.

21. The system of claim 5, wherein the data processor is configured to use one or more rules or queries for comparing the second encrypted usage information to the taxonomy or other data structure of data labels, at least some of the one or more rules specifying an occurrence threshold, a value range, or a label value.

22. The system of claim 10, wherein the usage information includes information that is indicative of at least one of web browsing, purchases, navigation, geolocation, application usage, online/offline service usage, user preferences, transaction data, credit card or payment information, offline purchases, commerce information, IoT/navigation related data, electrical grid balance information, polling data, political data, medical diagnosis/recommendation, or facial recognition feedback, and wherein the usage information includes at least one of keys, values, metadata, labels, or tags related to a webpage, online services, offline purchases and actions, or an application.

23. The system of claim 10, wherein at least one of the application or the management server is configured to organize the at least some of the usage information into a data hierarchy or a functional database structure using specified section information.

24. The system of claim 10, wherein the data processor is configured to use one or more rules or queries for comparing the second encrypted usage information to the taxonomy or other data structure of data labels, at least some of the one or more rules specifying an occurrence threshold, a value range, or a label value.

* * * * *